United States Patent [19]
Kerth et al.

[11] Patent Number: 6,148,048
[45] Date of Patent: Nov. 14, 2000

[54] RECEIVE PATH IMPLEMENTATION FOR AN INTERMEDIATE FREQUENCY TRANSCEIVER

[75] Inventors: Donald A. Kerth; Tod Paulus; Shyam S. Somayajula, all of Austin, Tex.; Tony G. Mellissinos, Carlsbad, Calif.

[73] Assignee: Cirrus Logic, Inc., Fremont, Calif.

[21] Appl. No.: 08/938,793

[22] Filed: Sep. 26, 1997

[51] Int. Cl.[7] .................................................. H04B 1/10
[52] U.S. Cl. ........................ 375/350; 375/345; 341/139; 455/234.1
[58] Field of Search .................................. 375/259, 219, 375/354, 221, 297, 318, 316, 295, 222, 358, 359, 340, 345, 350, 346; 708/300; 341/139; 330/278, 279, 282; 327/113; 455/234.1

[56] References Cited

U.S. PATENT DOCUMENTS

| | | | |
|---|---|---|---|
| 3,979,693 | 9/1976 | Saari | 331/61 |
| 4,070,632 | 1/1978 | Tuttle | 330/86 |
| 4,236,252 | 11/1980 | Kominami et al. | 455/207 |
| 4,277,697 | 7/1981 | Hall et al. . | |
| 4,355,283 | 10/1982 | Ott . | |
| 4,461,962 | 7/1984 | Hacke et al. . | |
| 4,527,075 | 7/1985 | Zbinden . | |
| 4,546,326 | 10/1985 | VanUffelen et al. | 330/129 |
| 4,680,588 | 7/1987 | Cantwell | 342/92 |
| 4,851,843 | 7/1989 | Neal | 341/139 |
| 4,857,928 | 8/1989 | Gailus et al. | 341/143 |
| 4,876,463 | 10/1989 | Lyle . | |
| 4,881,041 | 11/1989 | Kawanabe et al. . | |
| 4,885,475 | 12/1989 | Farina . | |

(List continued on next page.)

OTHER PUBLICATIONS

S. Jantzi et al., "A Complex Bandpass ΔΣ Converter For Digital Radio," pp. 453–456 (Year??).
S. Jantzi et al., "Transfer Function Design for ΔΣ Converters," pp. 433–436 (Year ??).
"Bandpass Sigma–Delta Modulation," Electronics Letters vol. 25, 2 pages (Nov. 9, 1989).
Jantzi et al., "Bandpass Sigma–Delta Analog–to–Digital Conversion," IEEE Transactions On Circuits and Systems, vol. 38, No. 11, pp. 1406–1409 (Nov. 1991).
Jantzi et al., "A Fourth–Order Bandpass Sigma–Delta Modulator," IEEE Journal of Solid–State Circuits, vol. 28, No. 3, pp. 282–291 (Mar. 1993).
Longo et al., "A 15b 30kHz Bandpass Sigma–Delta Modulator," IEEE International Solid–State Circuits Conference, Paper FA 14.1, pp. 226–227 (1993).
Song, "A 4th–Order Bandpass ΔΣ Modulator with Reduced Number of Opamps," IEEE International Solid–State Circuits Conference, Paper TP 12.1, pp. 204–205.
Aziz et al., "Performance of Complex Noise Transfer Functions in Bandpass and Multi Band Sigma Delta Systems," IEEE pp. 641–644 (1995).
Jantzi et al., "A Quadrature Bandpass ΔΣ Modulator for Digital Radio," IEEE International Solid–State Circuits Conference, FP 13.5, pp. 216–217, (1997).

*Primary Examiner*—Stephen Chin
*Assistant Examiner*—Lenny Jiang
*Attorney, Agent, or Firm*—J. P. Violette; Brian W. Peterman

[57] ABSTRACT

A receive path implementation for an intermediate frequency (IF) transceiver is disclosed that provides increased signal processing integrity and accuracy with an efficient and improved design. A complex filter for a bandpass delta-sigma analog-to-digital converter (ADC) provides efficient complex noise shaping with a combination of real and complex filters. An automatic gain control (AGC) amplifier provides a constant bandwidth and zero variation phase shift for all gain levels. Clock adjust circuitry provides a clock signal with a jitter-free edge and a high percentage duty cycle. A fixed-gain input amplifier provides a matched input impedance. A method for choosing design specifications provides improved anti-aliasing properties.

46 Claims, 19 Drawing Sheets

U.S. PATENT DOCUMENTS

| | | |
|---|---|---|
| 4,959,557 | 9/1990 | Miller . |
| 4,989,074 | 1/1991 | Matsumoto . |
| 5,050,192 | 9/1991 | Nawata . |
| 5,053,639 | 10/1991 | Taylor . |
| 5,083,304 | 1/1992 | Cahill . |
| 5,142,695 | 8/1992 | Roberts et al. ............................ 455/550 |
| 5,194,826 | 3/1993 | Huusko ................................... 330/302 |
| 5,220,468 | 6/1993 | Sidman ................................ 360/77.05 |
| 5,235,410 | 8/1993 | Hurley . |
| 5,267,272 | 11/1993 | Cai et al. . |
| 5,283,578 | 2/1994 | Ribner et al. ............................ 341/143 |
| 5,345,406 | 9/1994 | Williams . |
| 5,349,546 | 9/1994 | Sharman . |
| 5,374,966 | 12/1994 | Weigand ................................. 348/707 |
| 5,430,890 | 7/1995 | Vogt et al. ............................. 455/180.3 |
| 5,442,353 | 8/1995 | Jackson .................................... 341/143 |
| 5,446,415 | 8/1995 | Kirisawa ................................. 330/302 |
| 5,451,948 | 9/1995 | Jekel ........................................ 341/139 |
| 5,481,228 | 1/1996 | Badyal ....................................... 331/74 |
| 5,491,440 | 2/1996 | Uehara et al. ........................... 327/172 |
| 5,500,645 | 3/1996 | Ribner et al. ............................ 341/143 |
| 5,557,642 | 9/1996 | Williams .................................. 375/316 |
| 5,572,158 | 11/1996 | Lee et al. ................................. 327/175 |
| 5,646,578 | 7/1997 | Loh et al. ................................ 330/279 |
| 5,712,628 | 1/1998 | Phillips et al. ....................... 340/10.51 |
| 5,724,007 | 3/1998 | Mar ........................................ 331/1 A |
| 5,742,189 | 4/1998 | Yoshida et al. .......................... 327/113 |
| 5,862,465 | 1/1999 | Ou ......................................... 455/234.1 |
| 5,872,810 | 2/1999 | Philips et al. ............................ 375/222 |
| 5,973,601 | 10/1999 | Campans, Jr. ....................... 340/573.4 |

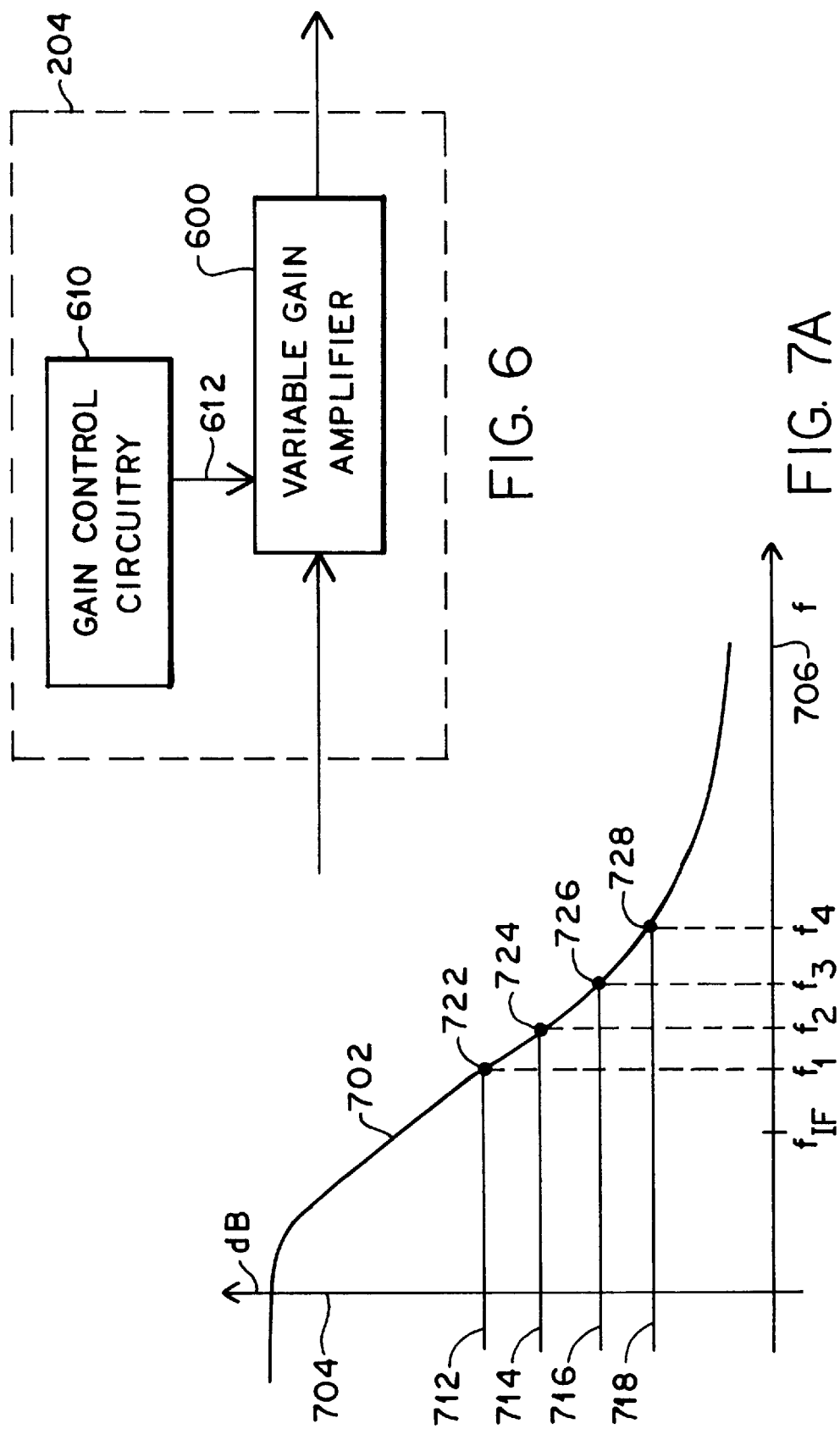

6,148,048

RECEIVE PATH IMPLEMENTATION FOR AN INTERMEDIATE FREQUENCY TRANSCEIVER

BACKGROUND OF THE INVENTION

1. Field of the Invention

The present invention relates to intermediate frequency (IF) transceivers used to process analog signals converted to IF frequencies, and more specifically to receive path implementations for IF transceivers.

2. Description of Related Art

Intermediate frequency (IF) transceivers are used in a variety of applications to process IF signals converted from different frequency electro-magnetic transmissions. IF transceivers may be implemented as CMOS integrated circuits (ICs) with on-chip signal processing. One application for an IF transceiver is in a small size radio for a consumer NPCS service. In this application, the IF transceiver has receive section circuitry, which converts IF analog signals to digital baseband I and Q data, and transmit section circuitry, which converts digital baseband I and Q data to IF analog signals. The digital baseband I and Q data may also be provided to other ICs in the NPCS radio.

The receive section circuitry of IF transceivers converts analog IF input signals to digital complex baseband signals. Prior receive path implementations for IF transceivers have suffered from numerous problems. Signal distortion occurs if the input fixed-gain amplifier does not have matched impedance. Output integrity and data conversion accuracy is lost if the AGC amplifier introduces varying phase shift into the signal path at different gain levels. Sample accuracy is degraded if the sampling circuitry does not operate on jitter-free clock edges, and power requirements are increased if the sample circuitry works on a clock period having a low percentage duty cycle. Design and circuit complexity is increased if the complex filter in the delta-sigma ADC is not made to efficiently handle quantization noise shaping. The performance of the receive path implementation is degraded if the design specifications are not chosen to provide good anti-aliasing properties.

SUMMARY OF THE INVENTION

In accordance with the present invention, a receive path implementation for an intermediate frequency (IF) transceiver provides increased signal processing integrity and accuracy with an efficient and improved design. In one embodiment, a complex filter for a bandpass delta-sigma analog-to-digital converter (ADC) provides efficient complex noise shaping with a combination of real and complex filters. In another embodiment, an automatic gain control (AGC) amplifier provides a constant bandwidth and zero deviation phase shift for all gain levels. In another embodiment, clock adjust circuitry provides a clock signal with a jitter-free edge and an increased percentage duty cycle. In a further embodiment, a fixed-gain input amplifier provides a matched input impedance. In still a further embodiment, a method for choosing design specifications provides improved anti-aliasing properties.

BRIEF DESCRIPTION OF THE DRAWINGS

FIG. 6 is a block diagram of an automatic gain control (AGC) amplifier according to the present invention.

FIG. 7A is a graphical representation of the frequency response bandwidth at four different gain settings for a variable gain amplifier lacking constant bandwidth over all gain steps.

DESCRIPTION OF THE PREFERRED EMBODIMENTS

Figure 1:
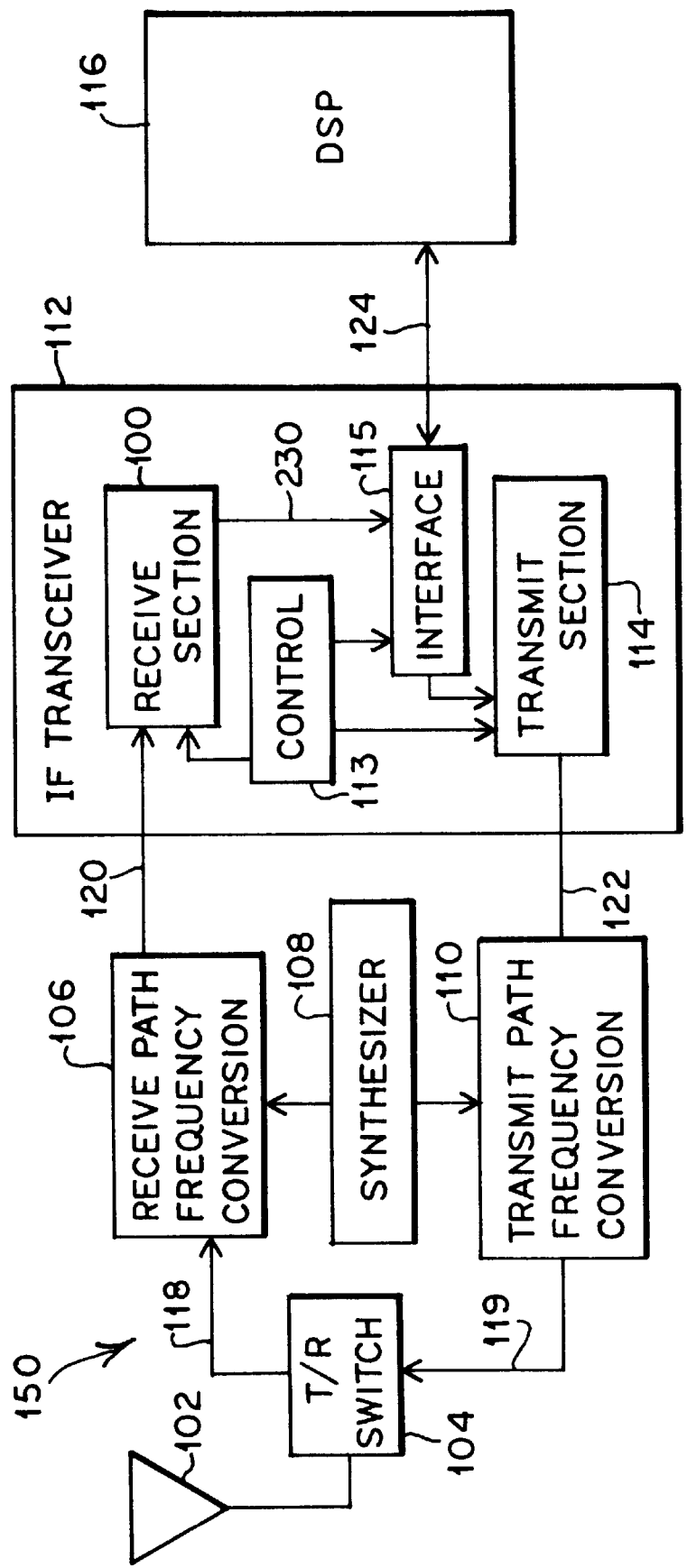
FIG. 1 is a block diagram of a system utilizing an intermediate frequency (IF) transceiver integrated circuit having a receive section according to the present invention.

FIG. 1 is a block diagram of a communications system 150 utilizing an intermediate frequency (IF) transceiver integrated circuit (IC) 112 having a receive section 100 according to the present invention. The system 150 has an antenna 102 connected to a transmit/receive (T/R) switch 104. The T/R switch 104 is connected to receive-path frequency conversion circuitry 106 and transmit-path frequency conversion circuitry 110, which both receive inputs from a synthesizer 108. The IF transceiver IC 112 includes control circuitry 113, interface circuitry 115, a transmit section 114 and a receive section 100. The IF transceiver IC 112 is connected to digital signal processing (DSP) circuitry 116 through communication bus 124.

One application for the system 150 shown in FIG. 1 is as a wireless communication, two-way paging system that receives and transmits radio-frequency (RF) signals through the antenna 102. In operation, the T/R switch 104 acts to connect the antenna 102 to either the receive path or the transmit path of the system 150. Receive-path frequency conversion circuitry 106 utilizes input from the synthesizer 108 to convert the received RF signals 118 into IF signals 120, which are provided to the receive section 100 of the IF transceiver IC 112. The transmit-path frequency conversion circuitry 110 utilizes input from the synthesizer 108 to convert IF signals 122 from the transmit section 114 of the IF transceiver IC 112 to RF signals 119, which are provided to the antenna 102 through the T/R switch 104. The DSP circuitry 116 receives output data from and communicates with IF transceiver IC 112 through interface 115 and communication bus 124. The DSP circuitry 116 provides desired signal processing for the signals received and transmitted by system 150.

Figure 2:
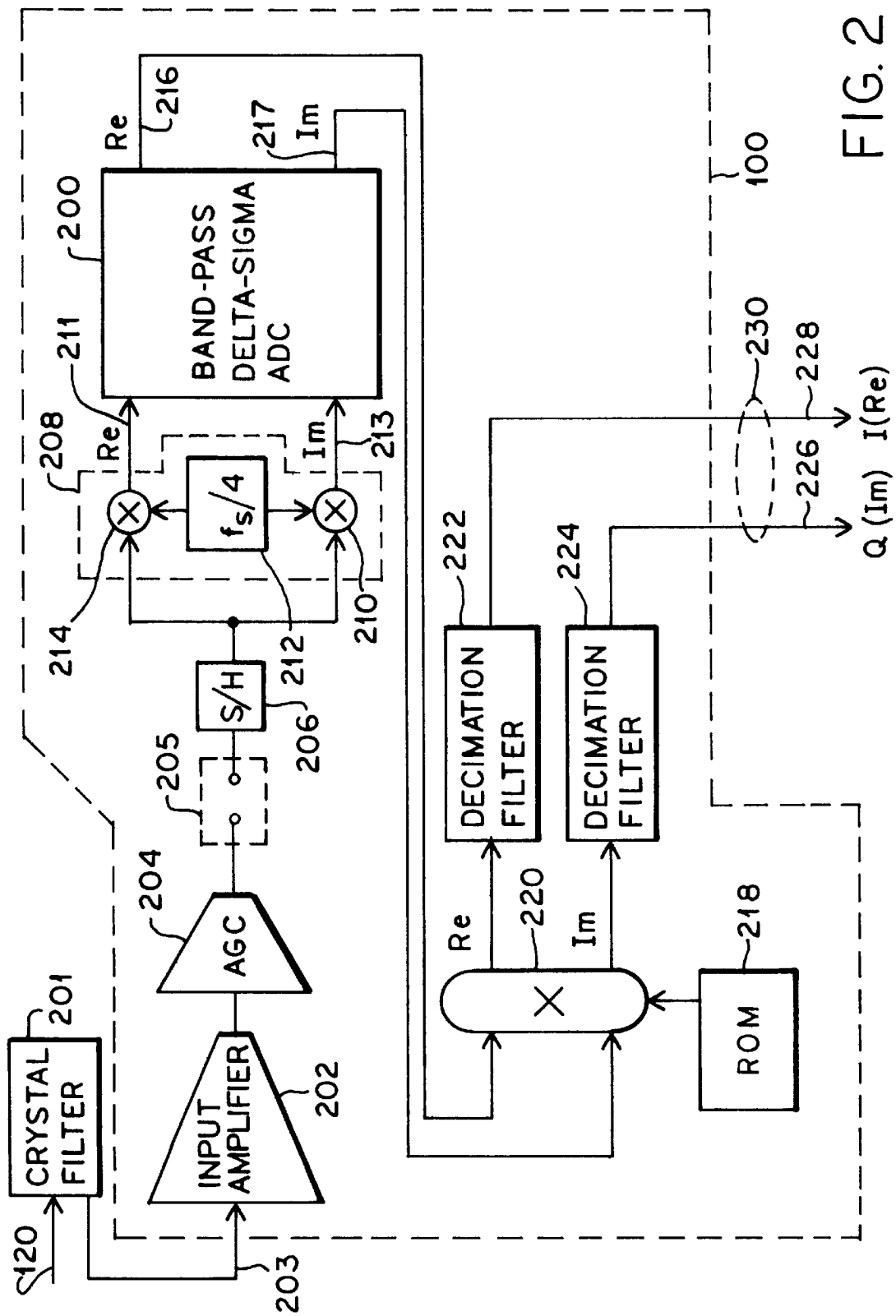
FIG. 2 is a more detailed block diagram of the receive section of an IF transceiver according to the present invention.

FIG. 2 is a block diagram of the receive section 100 of the IF transceiver IC 112 according to the present invention. A fixed-gain input amplifier 202 receives the IF signals 120 and provides a gain-adjusted signal to the automatic gain control (AGC) amplifier 204. Pre-filtering may be added outside of the IF transceiver IC 112 by a crystal filter 201, which receives the IF signals 120 and provides filtered IF signals 203 to input amplifier 202. Connections 205 also allow an external LC tank to be connected between the AGC amplifier 204 and the sample-and-hold (S/H) sampling circuitry 206. The external LC tank filters the signal received from the AGC amplifier 204 and uses inductors (Ls) and capacitors (Cs) to pass desired frequencies on to the rest of the circuit. Sampling circuitry 206 provides sampled values to analog quadrature down conversion block 208. Quadrature down conversion block 208 has mixers 214 and 210 connected to dividing circuitry 212, which divides the system sampling frequency ($f_s$) by four and provides a signal to mixer 210 that is shifted by one-fourth cycle (90°) from the signal to mixer 214. A bandpass delta-sigma analog-to-digital converter (ADC) 200 receives a real (Re) input signal 211 and an imaginary (Im) input signal 213 from analog quadrature conversion block 208. The real (Re) digital output 216 and the imaginary (Im) digital output 217 from bandpass delta-sigma ADC 200 passes to a digital complex down conversion block 220, which utilizes information from a read-only-memory (ROM) 218 to perform the conversion processing. The real (Re) and imaginary (Im) digital signals are then processed by decimation filters 222 and 224, which provide an output signal 230, including I (Re) output data 228 and Q (Im) output data 226, to the interface 115 of the IF transceiver IC 112.

In operation, the analog IF input signal 120 is filtered by crystal filter 201 and then amplified by the fixed-gain input amplifier 202 and by a variable gain applied by AGC amplifier 204. The gained analog signals are next filtered by the external anti-aliasing filter connected to connections 205, and sampling circuitry 206 samples the analog signals at a system sampling frequency ($f_s$). The sampled signals are mixed with a complex $f_s/4$ carrier and then processed by complex bandpass delta-sigma ADC 200, which converts the analog complex signal to a 1-bit digital complex signal. The 1-bit digital complex signal is frequency shifted to a baseband signal, filtered, and decimated down to provide resulting I and Q digital signals.

Figure 3:
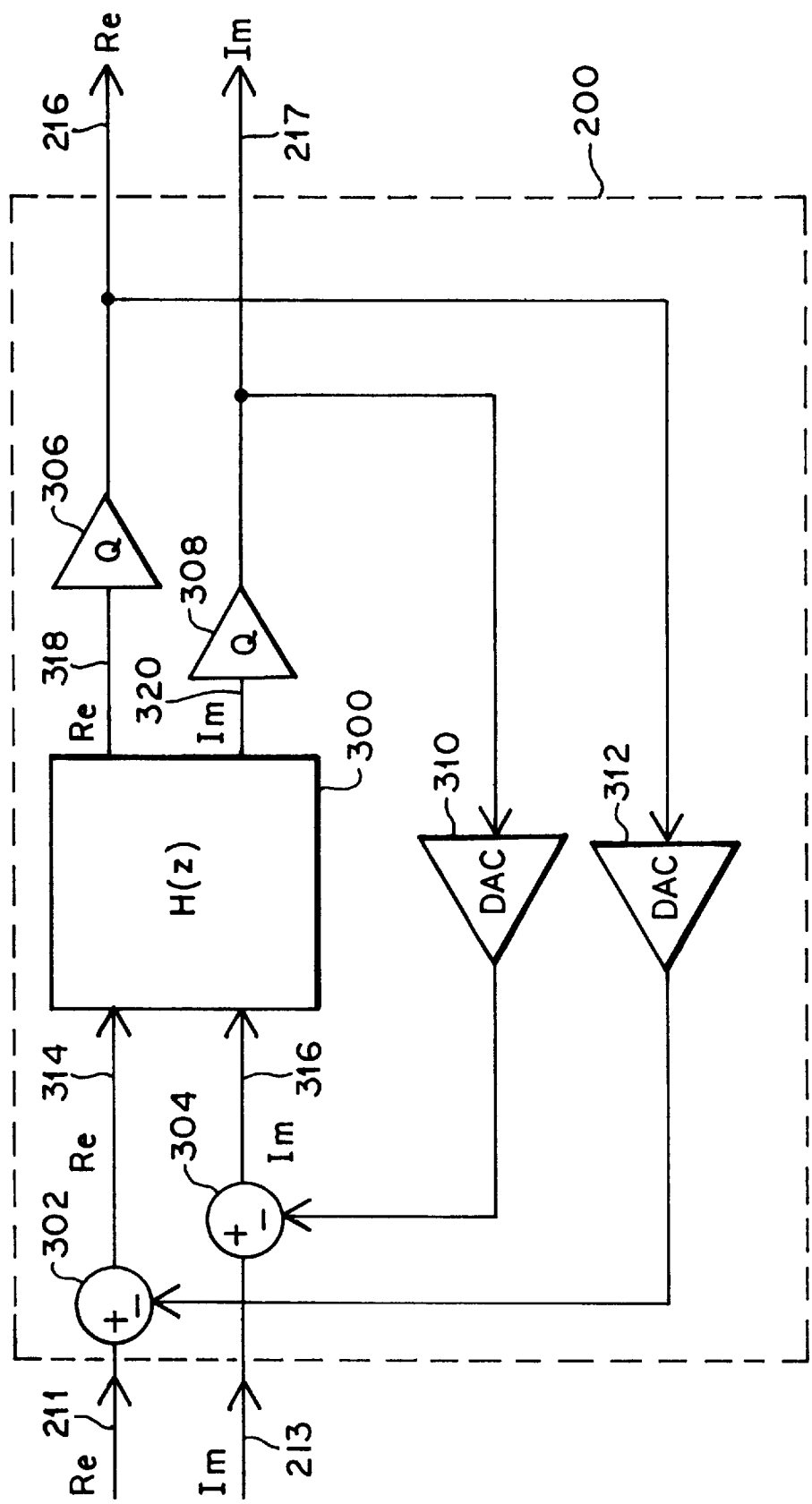
FIG. 3 is a block diagram of a bandpass delta-sigma analog-to-digital converter (ADC), including a complex loop filter (H(z)), according to the present invention.

FIG. 3 is a block diagram of a bandpass delta-sigma ADC 200, which includes a complex loop filter (H(z)) 300 according to the present invention. Bandpass delta-sigma ADC 200 receives the real (Re) analog input signal 211 and the imaginary (Im) analog input signal 213 and provides as an output the real (Re) digital output signal 216 and the imaginary (Im) digital output signal 217. Subtracters 302 and 304 receive the complex input signals 211 and 213 and subtract analog feedback from the digital output signals 216 and 217, which are converted by digital-to-analog (DAC) converters 310 and 312, respectively. The complex loop filter (H(z)) 300 receives real (Re) and imaginary (Im) signals 314 and 316 from subtracters 302 and 304 and provides as an output real (Re) and imaginary (Im) filtered signals 318 and 320 to ADCs 306 and 308, which may be 1-bit ADCs or quantizers (Q). The complex loop filter (H(z)) 300 operates on discrete time, rather than continuous time, and may be a fully differential design.

Figure 4:
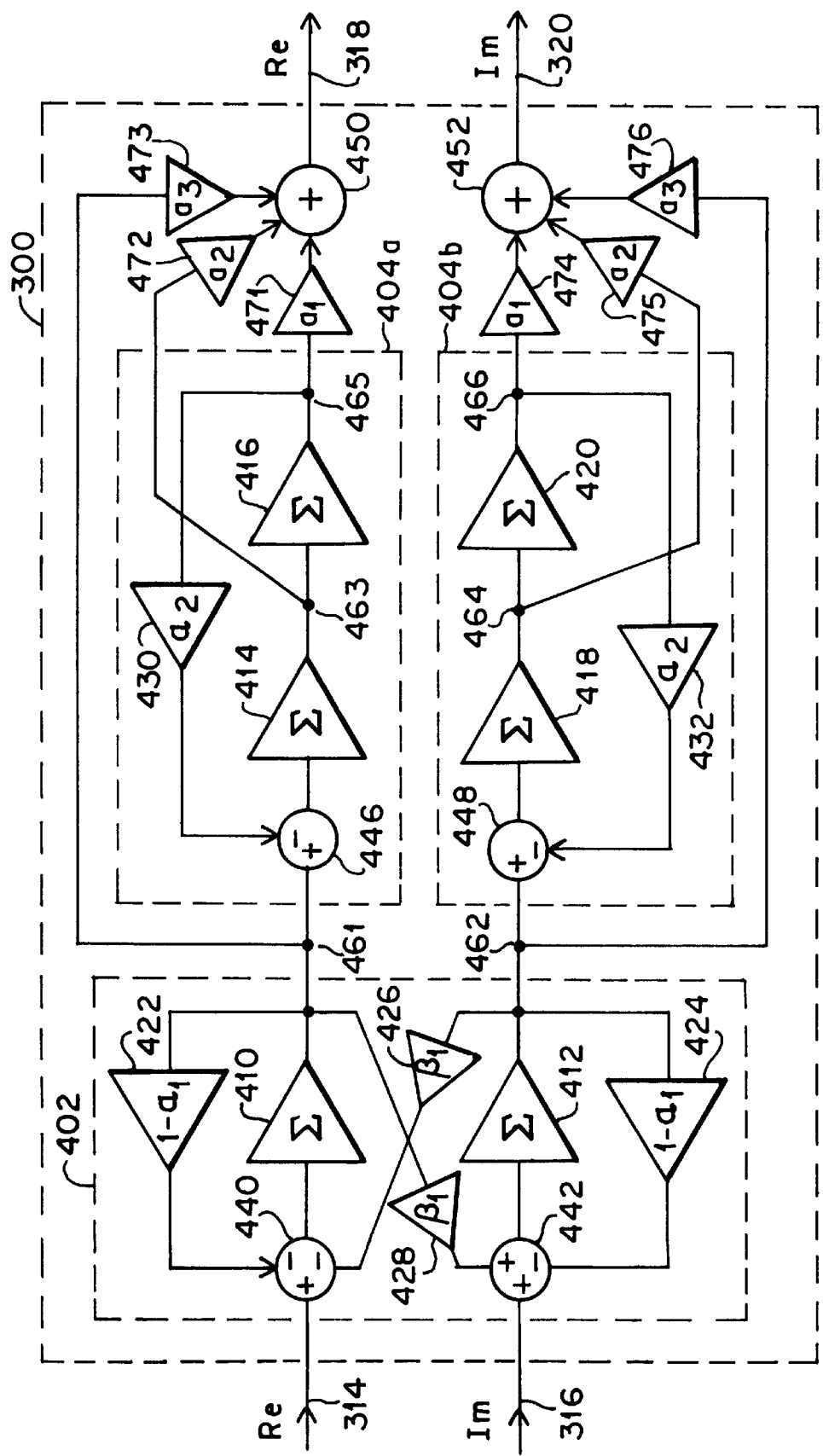
FIG. 4 is a more detailed block diagram of a complex loop filter (H(z)) according to the present invention.

FIG. 4 is a block diagram of a complex loop filter (H(z)) 300 according to the present invention. Complex loop filter (H(z)) 300 receives the analog real (Re) input signal 314 and the analog imaginary (Im) input signal 316 and provides as an output the real (Re) filtered output signal 318 and the imaginary (Im) filtered output signal 320. A complex filter or resonator 402 is connected to two independent real filters or resonators 404a and 404b. Complex filter 402 includes integrator 410 connected between subtracter 440 and node 461 and includes integrator 412 connected between subtracter 442 and node 462. Subtracter 440 receives real (Re) input signal 314, subtracts the feedback from node 461 through coefficient 422, which has a gain of 1-$\alpha_1$, and subtracts the feedback from node 462 through coefficient 426, which has a gain of $\beta_1$. Subtracter 442 receives imaginary (Im) input signal 316, subtracts the feedback from node 462 through coefficient 426, which has a gain of 1-$\alpha_1$, and adds the feedback from node 461 through coefficient 428, which has a gain of $\beta_1$.

Real filter 404a includes integrator 414 connected between subtracter 446 and node 463 and includes integrator 416 connected between node 463 and node 465. Subtracter 446 receives the signal from node 461 and subtracts the feedback from node 465 through coefficient 430, which has a gain of $\alpha_2$. Real filter 404b includes integrator 418 connected between subtracter 448 and node 464 and includes integrator 420 connected between node 464 and node 466. Subtracter 448 receives the signal from node 462 and subtracts the feedback from node 466 through coefficient 432, which has a gain of $\alpha_2$. The integrators 410 and 412 for the first stage complex filter 402 utilize high performance, high-power operational amplifiers. The integrators 414, 416, 418 and 420 for the subsequent stage real filters 404a and 404b may use lower performance and lower power operational amplifiers.

Adder 450 provides real (Re) filtered output signal 318 by combining the signal from node 461 through coefficient 473 with gain $a_3$, the signal from node 463 through coefficient 472 with gain $a_2$, and the signal from node 465 through coefficient 471 with gain $a_1$. Adder 452 provides imaginary (Im) filtered output signal 320 by combining the signal from node 462 through coefficient 476 with gain $a_3$, the signal from node 464 through coefficient 475 with gain $a_2$, and the signal from node 466 through coefficient 474 with gain $a_1$. Coefficients 471 and 474, 472 and 475, and 473 and 476 are matched and allow additional control of the noise rejection of the complex loop filter (H(z)) 300.

Figure 5A:
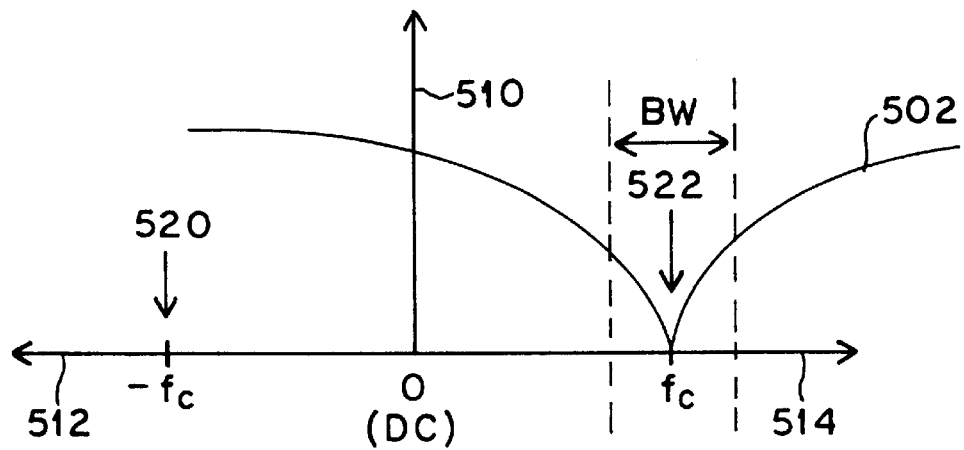
FIG. 5A depicts an example of a quantization noise rejection profile provided by a complex filter within a complex loop filter (H(z)).
Figure 5B:
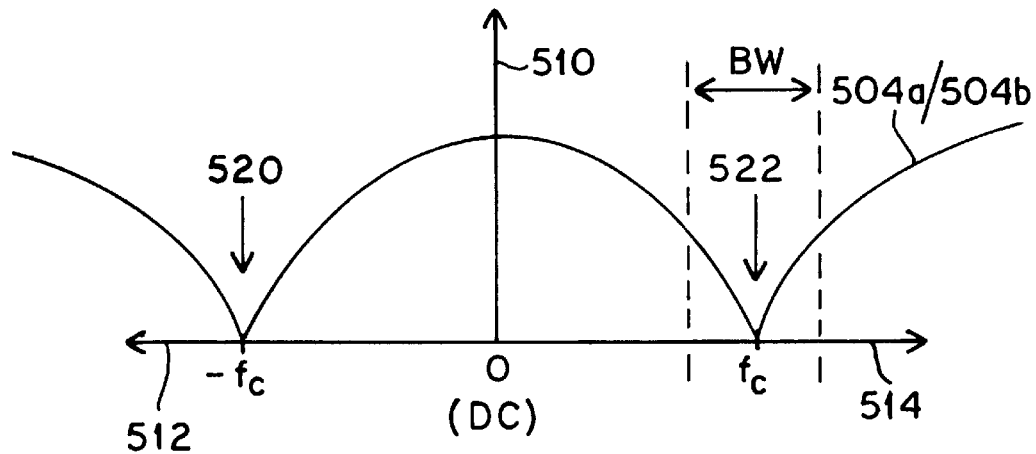
FIG. 5B depicts an example of a quantization noise rejection profile provided by real filter within a complex loop filter (H(z)).
Figure 5C:
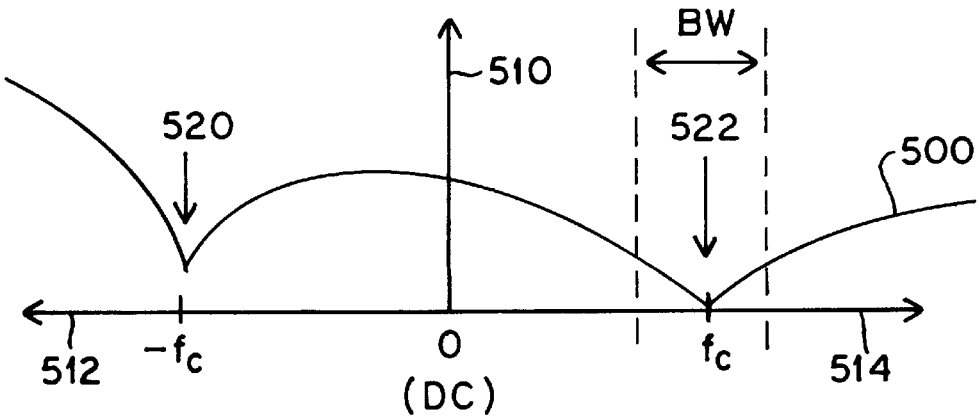
FIG. 5C depicts the combined quantization noise rejection profile provided by the complex filter of FIG. 5A and the real filter of FIG. 5B according to the present invention.

FIGS. 5A, 5B and 5C depict example quantization noise rejection profiles associated with complex filter 402 and real filters 404a and 404b.

FIG. 5A depicts an example of the quantization noise rejection profile 502 provided by complex filter 402 to the real and imaginary signal paths. The desired signal bandwidth (BW) for the output signals of the bandpass delta-sigma ADC 200 lies on the positive frequency axis 514 (DC occurs at f=0). The y-axis 510 represents the level of quantization noise rejection provided by complex filter 402. Complex filter 402 provides a pole at frequency ($f_c$) 522 centered within the desired bandwidth (BW) to generate a first order shaping of quantization noise within the desired bandwidth (BW). The negative frequency ($-f_c$) 520 associated with the desired center frequency ($f_c$) 522 lies on the negative frequency axis 512.

FIG. 5B depicts an example of the quantization noise rejection profile 504a/504b provided by real filter 404a to the real signal path and real filter 404b to the imaginary signal path. Real filters 404a and 404b provide a first pole at the center frequency ($f_c$) 522 and a second pole at the negative center frequency ($-f_c$) 520 to generate first order shaping of quantization noise within the desired bandwidth (BW) and at the negative center frequency ($-f_c$) 520. Each pair of integrators 414/416 and 418/420 form the complex conjugate poles at the desired center ($f_c$) and negative center ($-f_c$) frequencies, controlled by the gain $\alpha_2$ of coefficients 430 and 432.

FIG. 5C depicts the combined quantization noise rejection profile 500 provided by complex filter 402 and real filter 404a to the real signal path and by complex filter 402 and real filter 404b to the imaginary signal path. Complex filter 402 provides the quantization noise transfer function with a complex zero, and real filters 404a and 404b each provides the quantization noise transfer function with a complex conjugate zero pair, in which the zeros are dependent upon each other. When combined, second order shaping occurs within the desired bandwidth (BW) at the center frequency ($f_c$) 522. First order shaping occurs at the negative center frequency ($-f_c$) 520. Additional order shaping may be provided if desired by adding additional complex or real filters. It is also noted that the order of the complex filter 402 and real filters 404a and 404b may be modified without departing from the present invention.

In operation, quantization noise at the negative center frequency ($-f_c$) 520 tends to fold over into the region of the desired bandwidth (BW) due to a non-linear transfer function caused primarily by mismatched gains between DAC 310 and DAC 312 and by mismatches between coefficients 422 and 424 and between coefficients 426 and 428 in the first stage complex filter 402. Additional, but less severe, foldover problems are caused by mismatches between the coefficients 430 and 432 in the second stage real filters 404a and 404b. This frequency fold-over causes undesirable distortion and adversely affects performance of the complex ADC 200, unless signals occurring at the negative center frequency ($-f_c$) 520 are rejected by the loop filter (H(z)) 300. First order shaping at the negative center frequency ($-f_c$) 520 is generally enough to provide adequate noise shaping, although higher order shaping at both the negative center frequency ($-f_c$) 520 and the center frequency ($f_c$) 522 may be implemented if desired.

Prior complex filter approaches would require three cascaded complex filters to achieve similar quantization noise rejection as shown in FIG. 5C. A first and a second complex filter would provide second order shaping at the center frequency ($f_c$) 522, and a third complex filter would provide first order shaping at the negative center frequency ($-f_c$) 520. This complex filter approach suffers from complicated cross-coupling of the real (Re) and imaginary (Im) signals in each complex filter and creates increased mismatch problems by providing additional coefficient pairs that can potentially be mismatched. Prior real filter approaches could achieve second order shaping at both the center frequency ($f_c$) 522 and the negative center frequency ($-f_c$) 520 by using two cascaded real filters for quantization noise rejection for the real (Re) signals and by using two independent cascaded real filters for quantization noise rejection for the imaginary (Im) signals. This real filter approach suffers from requiring additional integrators and from requiring that each of the four integrators in two real filters in the first filter stage include high power, high performance operational amplifiers.

Unlike these complex-only and real-only filter approaches, the present invention takes advantage of the positive and negative frequency poles created by real filters 404a and 404b to provide the desired shaping for the real signal path and the imaginary signal path. Thus, the invention combines a cross-coupled complex filter in the first stage with independent real filters in the second stage to provide quantization noise rejection for the real (Re) and imaginary (Im) signals. This hybrid approach greatly reduces circuit complexity, reduces the number of potential mismatched coefficients, and enhances response linearity as compared to utilizing only complex filters or only real filters to achieve the desired shaping at the center frequency and at the negative center frequency.

FIG. 6 is a block diagram of the automatic gain control (AGC) amplifier 204 according to the present invention. Variable gain amplifier 600 receives the input to AGC amplifier 204. Gain control circuitry 610 controls the gain levels applied by variable gain amplifier 600 through control signals 612.

FIG. 7A is a graphical representation of the frequency response bandwidth at four different gain settings for a variable gain amplifier lacking constant bandwidth over all of the gain steps. The vertical axis 704 is a dB level, and the horizontal axis 706 is frequency (f). The line 702 represents the open loop gain of variable gain amplifier 600. The lines 712, 714, 716, and 718 represent the closed loop gain for four different discrete gain level settings for variable gain amplifier 600. The −3 dB points 722, 724, 726 and 728 for each of these gain level settings define different respective bandwidth frequencies $f_1$, $f_2$, $f_3$ and $f_4$ for these gain levels. The deviation in bandwidth at different gain settings correlates to a variation in the phase shift added by variable gain amplifier 600 to the signal it processes at the different gain levels. This variation in phase shift ($\Delta\phi$) between any two gain level settings (n1, n2) is given by $\Delta\phi_{n1-n2}=\tan^{-1}(f_c/f_{n1})-\tan^{-1}(f_c/f_{n2})$, where $f_c$ is the center frequency for the input signals.

Although negligible if the center frequency $f_c$ is substantially less than the bandwidth frequencies $f_1$, $f_2$, $f_3$ and $f_4$, this phase shift variation ($\Delta\phi$) is significant for IF communication signals where the center frequencies ($f_{IF}$) are typically in the tens of megahertz (MHz) range. For certain modulation schemes, such as PSK and GMSK, in which the information is contained in the phase of the received signal, any variation in phase shift will degrade system performance and accuracy. In addition, phase shift variation degrades performance in systems that recover clock (CLK) from the input signal. Because it is impractical to design the bandwidth frequencies $f_1$, $f_2$, $f_3$ and $f_4$ to be substantially greater than the center frequency at IF levels, it is desirable that the AGC amplifier 204 have a constant phase shift over all gain level settings to avoid introducing error into system performance.

Figure 7B:
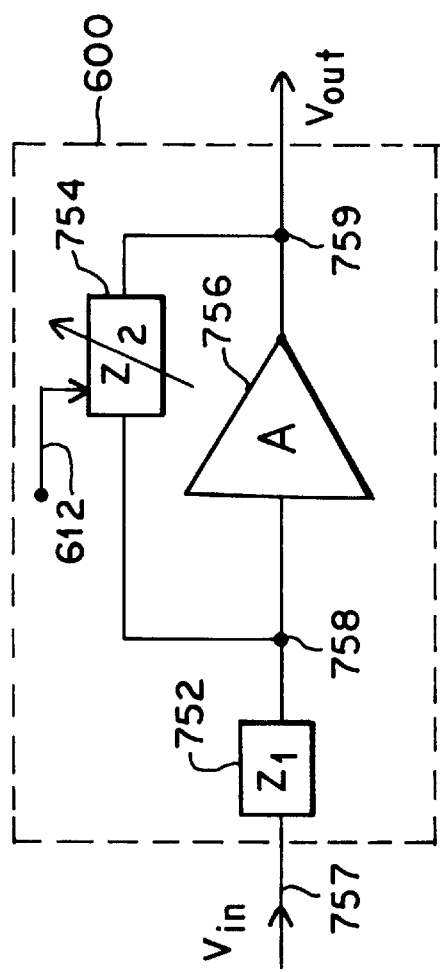
FIG. 7B is a block diagram of a variable gain amplifier lacking constant bandwidth over all gain steps.

FIG. 7B is a block diagram of a variable gain amplifier 600 lacking constant bandwidth over all gain steps. Amplifier 756 provides an open loop gain "A" and has a feedback impedance 754 ($Z_2$) connected between the output node ($V_{out}$) 759 and internal node 758. An input impedance 752 ($Z_1$) is connected between the input node ($V_{in}$) 757 and the internal node 758. The feedback impedance 754 ($Z_2$) provides a variable impedance amount, which is controlled by control signals 612 from gain control circuitry 610. This variable impedance amount allows different closed loop gain levels in FIG. 7A to be achieved.

Figure 8A:
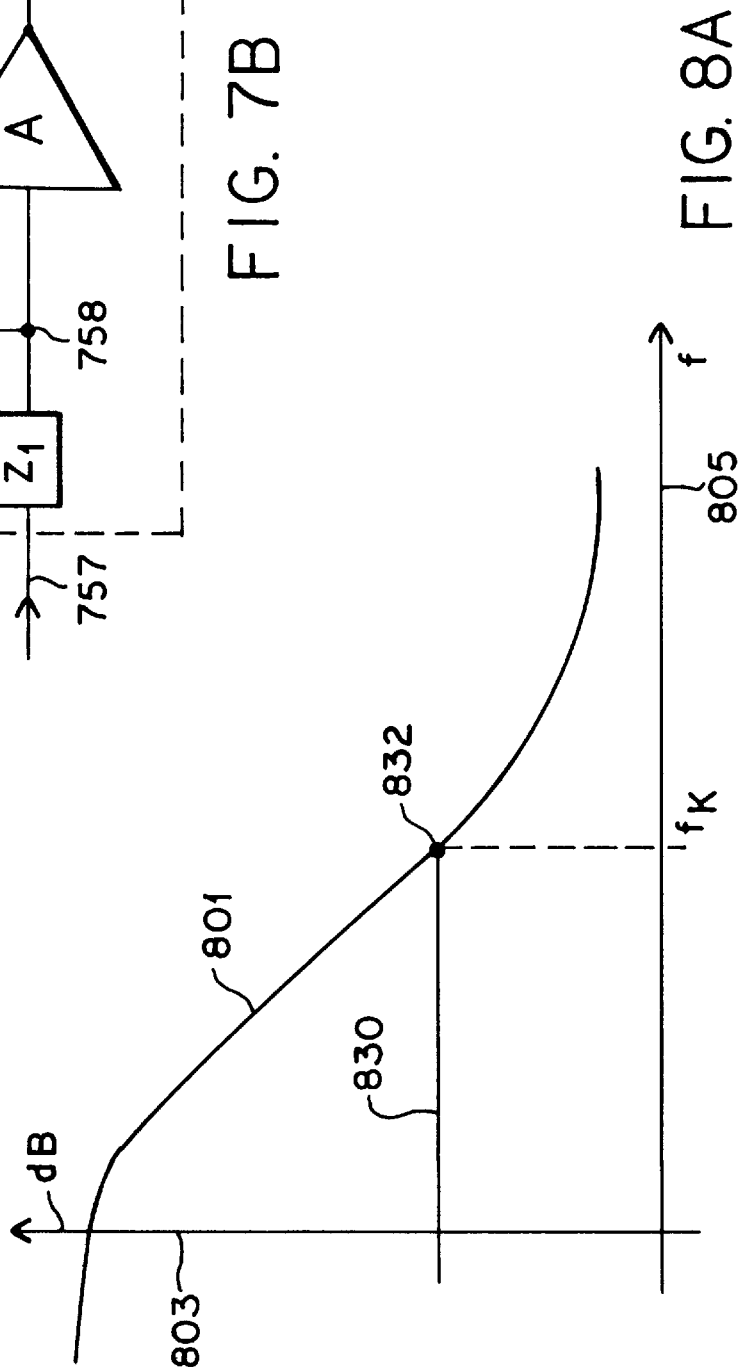
FIG. 8A is a graphical representation of the frequency response bandwidth for a variable gain amplifier having negligible phase shift variation according to the present invention.

FIG. 8A is a graphical representation of the frequency response bandwidth for a variable gain amplifier having constant phase shift over all gain settings according to the present invention. The vertical axis 803 is a dB level, and the horizontal axis 805 is frequency (f). The line 801 represents the open loop gain of variable gain amplifier 600. Unlike the closed loop gains 712, 714, 716 and 718 in FIG. 7A, the closed loop gain represented by line 830 in FIG. 7B is constant over all of the different gain level settings for variable gain amplifier 600. The −3 dB point 832 associated with the constant loop gain 830 defines a constant bandwidth frequency $f_K$ over all of the different gain level settings. By keeping the bandwidth constant over all of the gain level settings, the AGC amplifier 204 of the present invention reduces or eliminates variations in the phase shift between different discrete gain level settings.

Figure 8B:
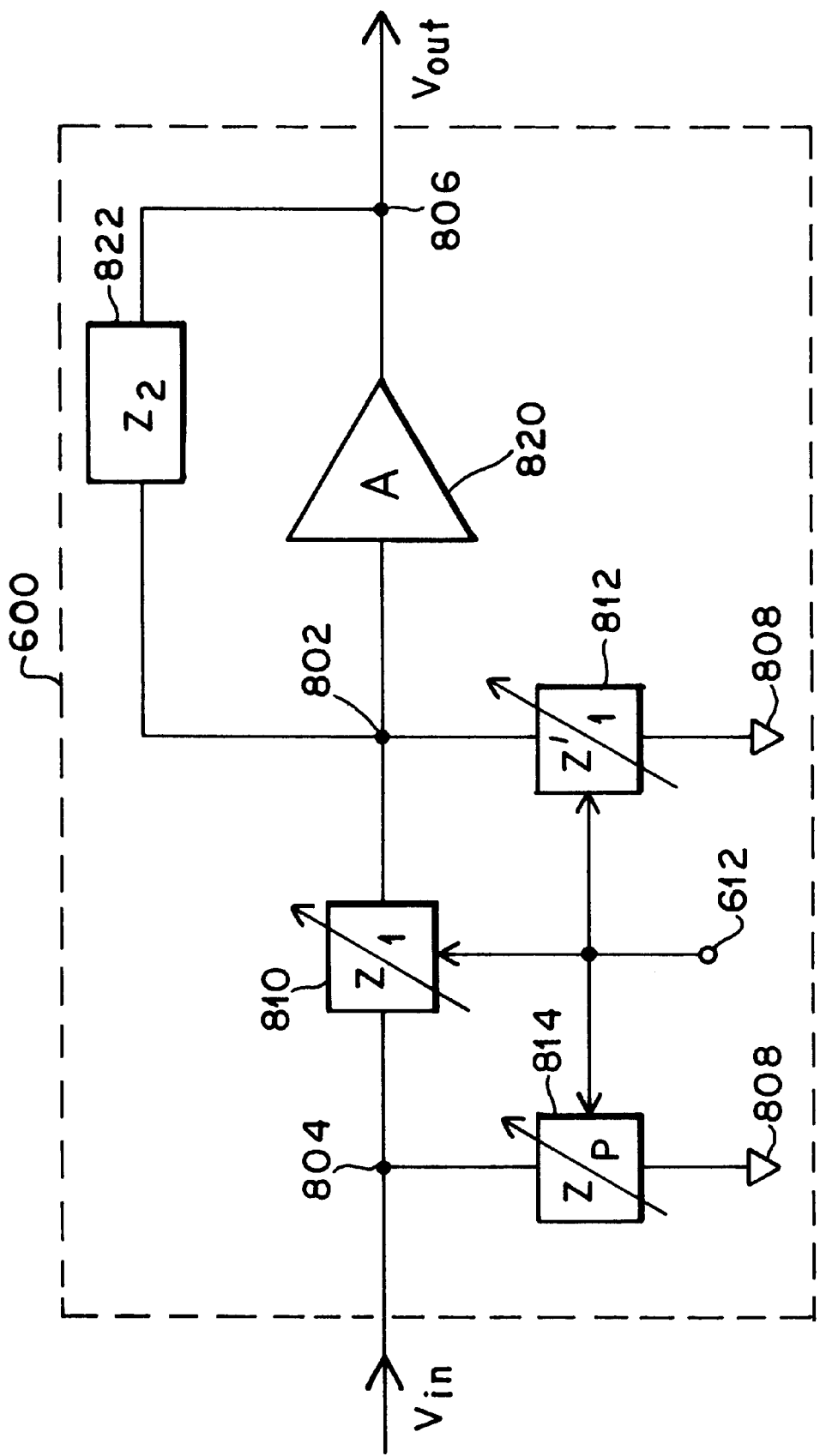
FIG. 8B is a block diagram of a variable gain amplifier within an AGC amplifier having a constant loop gain and negligible phase shift variation according to the present invention.

FIG. 8B is a block diagram of a variable gain amplifier 600 having a constant loop gain and zero or negligible phase shift variation according to the present invention. Amplifier 820 provides a gain "A" and has a feedback impedance 822 ($Z_2$) connected between the output node ($V_{out}$) 806 and internal node 802. An input impedance 810 ($Z_1$) is connected between the input node ($V_{in}$) 804 and the internal node 802. An input compensation impedance 812 ($Z_1'$) is connected between internal node 802 and ground or common mode voltage (VCM) 808. A previous-stage compensation impedance 814 ($Z_P$) is connected between input node 804 and ground 808. Input impedance 810 ($Z_1$), input compensation impedance 812 ($Z_1'$), and previous-stage compensation impedance 814 ($Z_P$) provide variable impedance amounts, which are controlled by control signals 612 from gain control circuitry 610.

In operation, the low frequency closed loop gain ($V_{out}/V_{in}$) of variable gain amplifier 600 is a function of the ratio of the feedback impedance 822 ($Z_2$) to the variable input impedance 810 ($Z_1$) given by $V_{out}/V_{in}=Z_2/Z_1$. Gain control circuitry 610 may apply a desired gain to the input signal by adjusting the variable input impedance 810 ($Z_1$).

The loop gain of variable gain amplifier 600 is a function of the gain "A" of amplifier 820, the variable input impedance 810 ($Z_1$) plus the input compensation impedance 812 ($Z_1'$), and the feedback impedance 822 ($Z_2$) given by $G_{loop}=A/[1+\beta A]$, where $\beta=(Z_1+Z_1')/(Z_2+Z_1+Z_1')$. To keep the loop gain constant over all of the gain level settings, the variable input compensation impedance 812 ($Z_1'$) is adjusted to provide compensation for any change in the variable input impedance 810 ($Z_1$), such that the impedance ($Z_1+Z_1'$) seen by amplifier 820 at internal node 802 is kept constant. Alternatively, the loop gain may be kept constant by adjusting the gain "A" of amplifier 820 and/or the feedback impedance 822 ($Z_2$) to compensate for the change in the variable input impedance 810 ($Z_1$), although these alternative approaches are more complex. The variable previous-stage compensation impedance 814 ($Z_P$) provides compensation for any change in the variable input impedance 810 ($Z_1$), such that the impedance ($Z_1+Z_P$) seen at input node 804 by previous-stage circuitry is kept constant. It is noted that the selectable gain levels for the AGC amplifier 204 may be either continuously selectable or discretely selectable gain levels depending upon whether the variable input impedance 810 ($Z_1$) provides either continuously selectable or discretely selectable impedance values.

Figure 9:
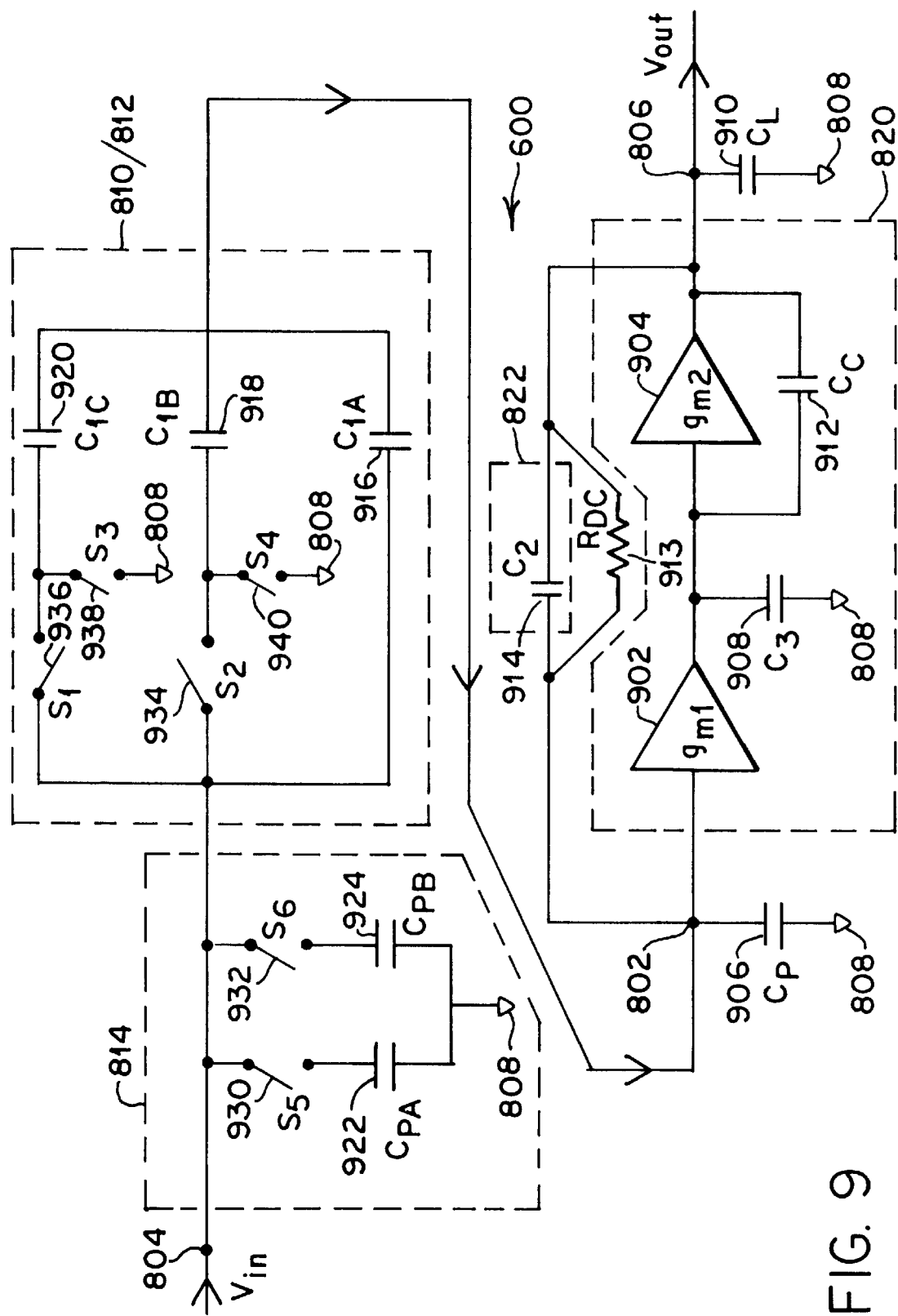
FIG. 9 is a more detailed circuit diagram of a variable gain amplifier having capacitor implementations for variable impedances.

FIG. 9 is a more detailed circuit diagram of the variable gain amplifier 600 having capacitor implementations for the variable previous-stage impedance 814 ($Z_P$), the variable input impedance 810 ($Z_1$), and the variable input compensation impedance 812 ($Z_1'$). Variable previous stage impedance 814 includes two capacitors 922 ($C_{PA}$) and 924 ($C_{PB}$), which are connected to ground 808 and selectively connectable to input node 804 through two switches 930 ($S_5$) and 932 ($S_6$), respectively. The variable input impedance 810 and the variable input compensation impedance 812 are implemented with a single capacitor network 810/812 to simplify the circuitry. Capacitor 916 ($C_{1A}$) is connected between the internal node 802 and the input node 804. Capacitor 918 ($C_{1B}$) is connected to the internal node 802 and alternatively connected to input node 804 or ground 808 through switches 934 ($S_2$) and 940 ($S_4$), respectively. Capacitor 920 ($C_{1C}$) is connected to the internal node 802 and alternatively connected to input node 804 or ground 808 through switches 936 ($S_1$) and 938 ($S_3$), respectively. If switch 936 ($S_1$) is closed, switch 938 ($S_3$) will be open, and if switch 936 ($S_1$) is open, switch 938 ($S_3$) will be closed. The same is true for the operation of switches 934 ($S_2$) and 940 ($S_4$). The switches 936 ($S_1$), 938 ($S_3$), 934 ($S_2$), and 940 ($S_4$) are controlled by gain control circuitry 610 to provide variable capacitances during operation, which are discretely selectable.

Amplifier 820 includes a first gain stage 902 having a transconductance "$g_{m1}$" and a second gain stage 904 having a transconductance "$g_{m2}$". The feedback impedance 822 is implemented with feedback capacitance 914 ($C_2$). A feedback resistor 913 ($R_{DC}$) is also provided to handle DC levels and is not considered part of the feedback impedance 822 because the feedback resistor 913 ($R_{DC}$) does not affect the gain at operating frequencies of variable gain amplifier 600. Capacitance 908 ($C_3$) represents internal parasitic capacitance for amplifier 820. Capacitance 906 ($C_P$) represents the total parasitic capacitance at internal node 802. Capacitance 912 ($C_C$) is a Miller compensation capacitor for the second gain stage 904. Capacitance 910 ($C_L$) is the load capacitance at output node 806.

In operation, the gain applied by variable gain amplifier 600 is adjusted by gain control circuitry 610 through selection of the input capacitance connected between internal node 802 and input node 804. In the embodiment shown in FIG. 9, four different discrete gain levels are selectably provided corresponding to switches 936 ($S_1$) and 934 ($S_2$) being both open ($C_{input}=C_{1A}$), switch 936 ($S_1$) being open and switch 934 ($S_2$) being closed ($C_{input}=C_{1A}+C_{1B}$), switch 936 ($S_1$) being closed and switch 934 ($S_2$) being open ($C_{input}=C_{1A}+C_{1C}$), and switches 936 ($S_1$) and 934 ($S_2$) being both closed ($C_{input}=C_{1A}+C_{1B}+C_{1C}$). For example, by selecting $C_2=C_{1A}=C_{1B}=C$ and $C_{1C}=2C$, discrete closed loop gain levels of 1×, 2×, 3× and 4× may be selectably applied by AGC amplifier 204. To keep the load capacitance constant at internal node 802 as seen by amplifier 820, capacitors 918 ($C_{1B}$) and 920 ($C_{1C}$) are connected to ground 808 through switches 938 ($S_3$) and 940 ($S_4$) when not connected to input node 804. The loop capacitance at input node 804 as seen by previous-stage circuitry is kept constant through the application of switches 930 ($S_5$) and 932 ($S_6$). Capacitance 924 ($C_{PB}$) is selected to match capacitance 920 ($C_{1C}$), and switch 932 ($S_6$) is closed any time switch 936 ($S_1$) is open. Capacitance 922 ($C_{PA}$) is selected to match capacitance 918 ($C_{1B}$), switch 930 ($S_5$) is closed any time switch 934 ($S_2$) is open.

The bandwidth of the amplifier 820, and thereby the phase shift created by amplifier 820, is kept substantially constant because the poles and zeroes of the transfer function of amplifier 820 remain constant for each of the selectable discrete gain level settings. The transfer function for amplifier 820 is given by $V_{out}/V_{in}(s)=(C_1/C_2)[s(1+s/Z_1)(1-s/Z_2)]/[(1+s/P_1)(1+s/P_2)(1+s/P_3)]$, where "$C_1$" is the total capacitance between internal node 802 and input node 804 (as used below, "$C_1$'" is the total capacitance between internal node 802 and ground 808), where $P_1$, $P_2$, and $P_3$ are the poles of the transfer function, and where $Z_1$ and $Z_2$ are the zeroes of the transfer function in addition to a zero at DC. From the capacitor implementations depicted in FIG. 9, the poles and zeroes are given by:

$Z_1 \approx g_{m1}/C_2$ $Z_2 \approx g_{m2}/C_C$ $P_1 \approx 1/(R_{DC}C_2)$ $P_2 \approx (g_{m1}/C_C)(C_2/(C_1+C_1'+C_P+C_2))$ $P_3 \approx g_{m2}/[C_3+C_L+(C_3C_L/C_C)]$ Only the pole $P_2$ is affected by a change in the variable input capacitance ($C_1$) 810. By connecting capacitors 918 ($C_{1B}$) and 920 ($C_{1C}$) to ground 808 when not connected to input node 804, the variable input compensation capacitance ($C_1'$) 812 compensates for changes in the variable input capacitance ($C_1$) 810 keeping constant the capacitance $C_1+C_1'$ in the denominator of the $P_2$ equation at $(C_1+C_1')=(C_{1A}+C_{1B}+C_{1C})$.

Figure 10:
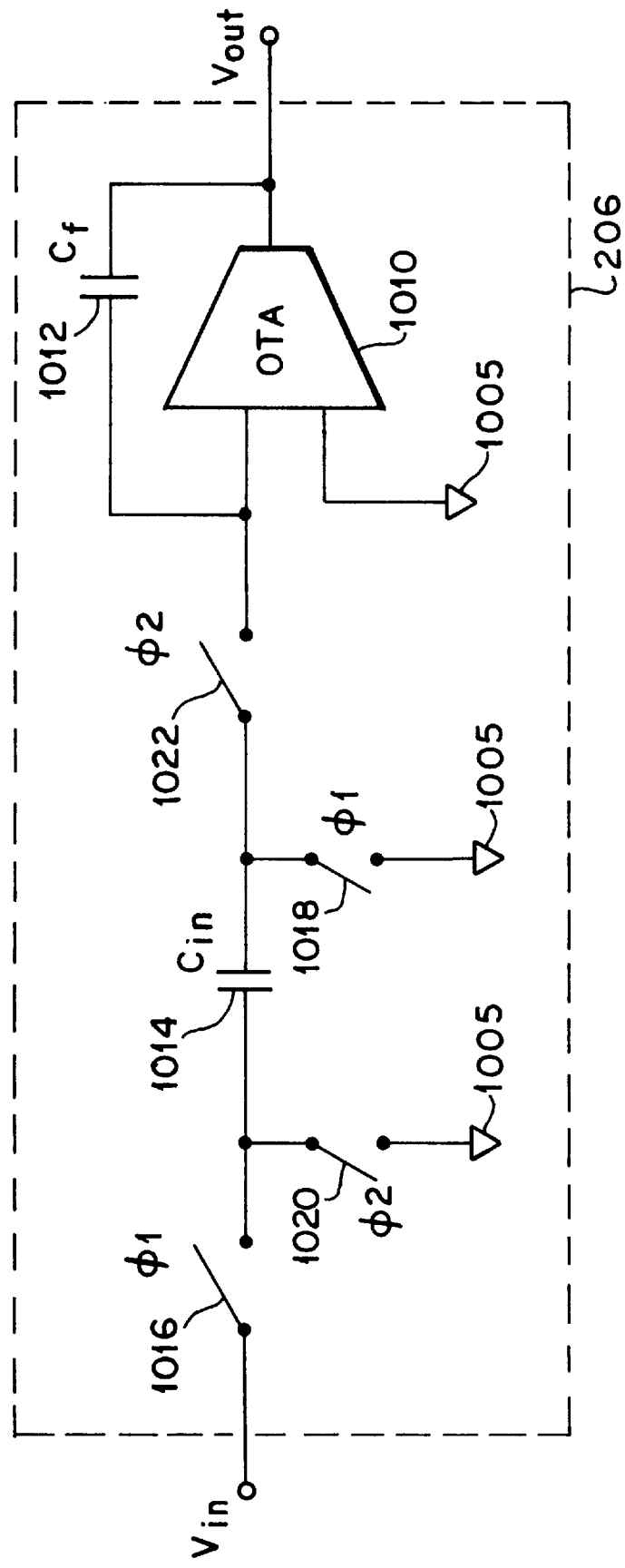
FIG. 10 is a diagram of a switched capacitor integrator incorporating a sampling network.

FIG. 10 is a diagram of a switched capacitor integrator, incorporating a sampling network, such as may be used within sample-and-hold (S/H) circuitry 206. One terminal of an input capacitor 1014 ($C_{in}$) is connected to the input $V_{in}$ through switch 1016 or alternatively to ground or common mode voltage (VCM) 1005 through switch 1020. The other terminal of the input capacitor 1014 ($C_{in}$) is connected to ground 1005 through switch 1018 or alternatively to a first input terminal of an operational transconductance amplifier (OTA) 1010 through switch 1022. A feedback capacitor 1012 ($C_f$) is connected between the output of OTA 1010 and the first input terminal of OTA 1010. OTA 1010 has a second input terminal connected to ground 1005 and provides a sampled output voltage $V_{out}$.

Figure 11:
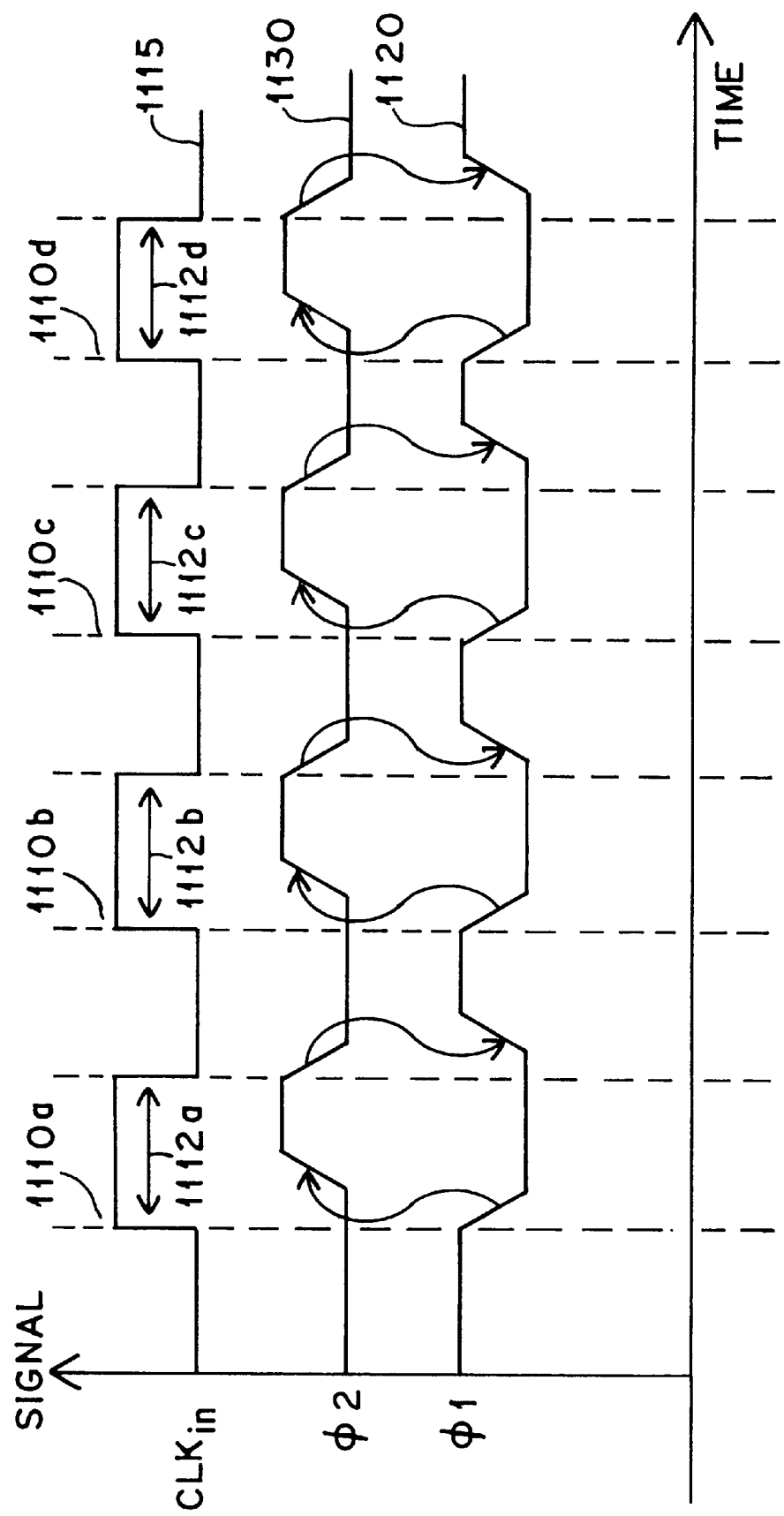
FIG. 11 is a timing diagram for clock signals used to time the switches in the sampling circuitry of FIG. 10.

FIG. 11 is a timing diagram for clock signals used to time the switches 1016, 1018, 1020, and 1022 of FIG. 10. A digital input clock signal ($CLK_{in}$) 1115 is used to generate two offset clock signals 1120 (φ1) and 1130 (φ2). The $CLK_{in}$ signal 1115 has a period defined by the time between rising edges 1110a, 1110b, 1110c, and 1110d. A portion 1112a, 1112b, 1112c, and 1112d of each period occurs between the rising edges 1110a, 1110b, 1110c, and 1110d and the failing edges of the $CLK_{in}$ signal 1115. The φ2 signal 1130 rises in response to the falling edges of the φ1 signal 1120 and falls in response to the falling edges of the $CLK_{in}$ signal 1115. The φ1 signal 1120 rises in response to the falling edges 1110a, 1110b, 1110c, and 1110d of the $CLK_{in}$ signal 1115 and falls in response to the falling edges of the φ2 signal 1130. The φ1 signal 1120 and the φ2 signal 1130, therefore, are non-overlapping clock signals. The duty cycle of the $CLK_{in}$ signal 1115 is the percentage of time within each period that is taken up by the portions 1112a, 1112b, 1112c, and 1112d in which the $CLK_{in}$ signal 1115 is high. For example, a 50% duty cycle would have half of each period occurring before the falling edge of the $CLK_{in}$ signal 1115, and a 30% duty cycle would have 30% of each period occurring before the falling edge of the $CLK_{in}$ signal 1115.

In operation, the sampling circuitry within sample-and-hold (S/H) circuitry 206 samples the input voltage $V_{in}$ at regular intervals. The φ1 signal 1120 controls switches 1016 and 1018, and the φ2 signal 1130 controls switches 1020 and 1022. On each falling edge of the $CLK_{in}$ signal 1115, the φ2 signal 1130 goes low and then the φ1 signal 1120 goes high. During this portion of each period of the $CLK_{in}$ signal 1115, the switches 1016 and 1018 close and the switches 1020 and 1022 open, allowing the input capacitor 1014 ($C_{in}$) to charge to the voltage present at $V_{in}$. On each rising edge of the $CLK_{in}$ signal 1115, the φ1 signal 1120 goes low and then the φ2 signal 1130 goes high. During these portions 1112a, 1112b, 1112c, and 1112d of each period of the $CLK_{in}$ signal 1115, the switches 1016 and 1018 open and the switches 1020 and 1022 close, allowing the input capacitor 1014 ($C_{in}$) to dump its charge onto the feedback capacitor 1012 ($C_f$). The charge on the feedback capacitor 1012 ($C_f$) provides the sampled output voltage $V_{out}$. To keep the sample rate constant for sampling circuitry 206, the period between each rising edge 1110a, 1110b, 1110c, and 1110d of the $CLK_{in}$ signal 1115 should be constant and jitter-free. Otherwise, error will be introduced due to the jitter. The term "jitter" refers to the deviation from a constant period between each successive edge (i.e. rising edge to rising edge, or falling edge to falling edge).

The timing of the charging and discharging of the input capacitor 1014 ($C_{in}$) impacts the desired characteristics of the $CLK_{in}$ signal 1115. The time required for the input capacitor 1014 ($C_{in}$) to fully charge is typically short compared to the period of the $CLK_{in}$ signal 1115. In contrast, the time required for the charge on the input capacitor 1014 ($C_{in}$) to fully dump to the feedback capacitor 1012 ($C_f$) is dependent upon the design of the OTA 1010 and is typically on the same order as the period of the $CLK_{in}$ signal 1115. The larger the portions 1112a, 1112b, 1112c, and 1112d of each period of the $CLK_{in}$ signal 1115, the slower the OTA 1010 must operate to move the charge on the input capacitor 1014 ($C_{in}$) to the feedback capacitor 1012 ($C_f$). The slower the OTA 1010 must operate, the less power and size the OTA 1010 must take up in the circuit design. The portions 1112a, 1112b, 1112c, and 1112d of each period of the $CLK_{in}$ signal 1115 and thereby the duty cycle of the $CLK_{in}$ signal 1115 should be increased.

Figure 12:
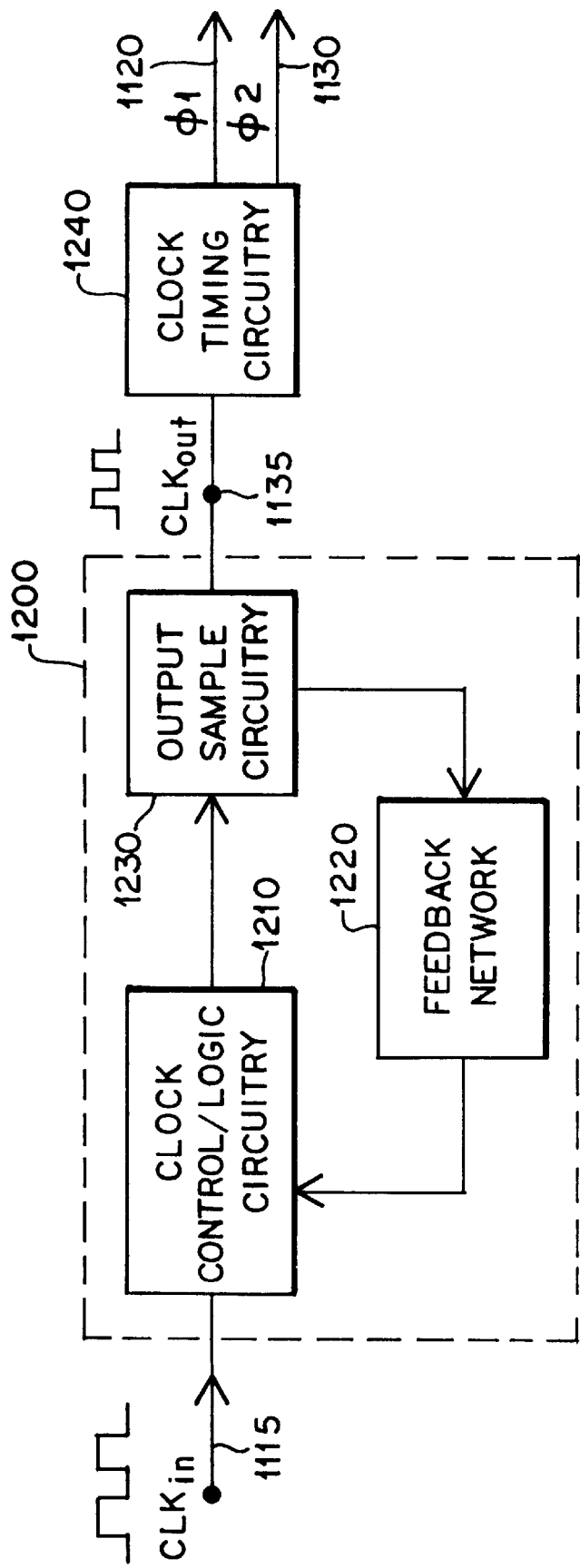
FIG. 12 is a block diagram of clock adjust circuitry for producing the timing signals of FIG. 11 according to the present invention.

FIG. 12 is a block diagram of clock adjust circuitry 1200 according to the present invention which allows the duty cycle to be increased to 50%. Clock control/logic circuitry 1210 receives the digital $CLK_{in}$ signal 1115 and a feedback signal from feedback network 1220. The output of clock control/logic circuitry 1210 is sampled by output sample circuitry 1230 to provide an input to feedback network 1220.

Clock timing circuitry 1240 receives the digital adjusted clock signal (CLK$_{out}$) 1135 and provides the φ1 signal 1120 and the φ2 signal 1130 as output signals to drive the switches 1016, 1018, 1020 and 1022 in FIG. 10. Clock adjust circuitry 1200 operates to modify the CLK$_{in}$ signal 1115 to provide the adjusted clock signal (CLK$_{out}$) 1135 with a jitter-free edge and/or an increased duty cycle.

Figure 13:
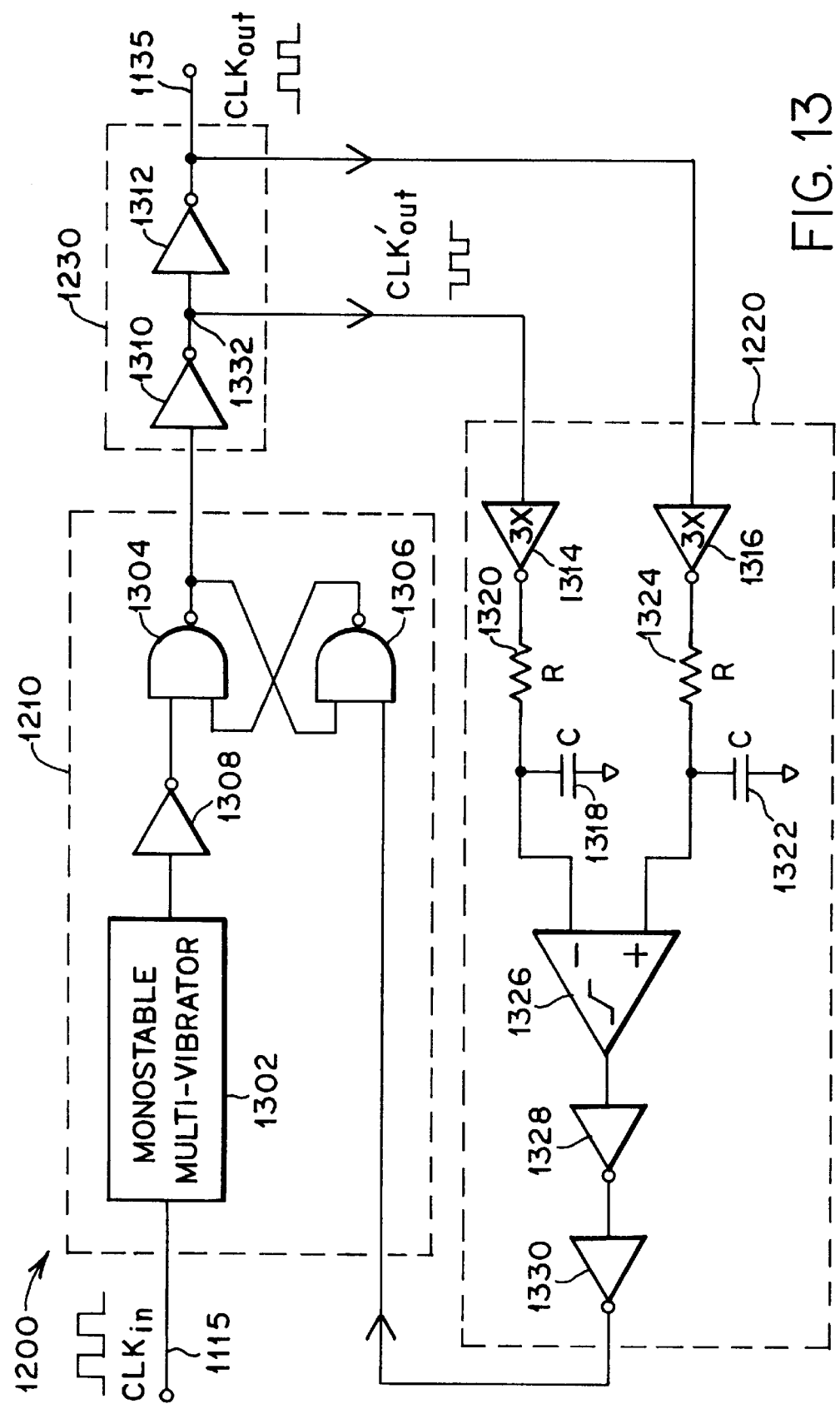
FIG. 13 is a more detailed circuit diagram of the clock adjust circuitry shown in FIG. 12 according to the present invention.

FIG. 13 is a more detailed circuit diagram of clock adjust circuitry 1200. Control/logic circuitry 1210 may include a monostable multi-vibrator or one-shot circuit 1302, an inverter 1308, and cross-coupled NAND gates 1304 and 1306. The monostable multi-vibrator 1302 receives the CLK$_{in}$ signal 1115 and provides one of the inputs to the NAND gate 1304 though inverter 1308. The other input to NAND gate 1304 is provided by the output of NAND gate 1306. NAND gate 1306 receives an input from the output of NAND gate 1304 and the feedback signal from the feedback network 1220. Output sample circuitry 1230 has two inverters 1310 and 1312 connected in series, which provide an inverted adjusted clock signal (CLK$_{out}$') 1332 and the digital adjusted clock signal (CLK$_{out}$) 1135. Feedback network 1220 includes comparator 1326, which outputs a high logic level as long as its negative input is less than its positive input, and inverters 1330 and 1328 connected between the output of comparator 1326 and the NAND gate 1306. The negative input of comparator 1326 is connected to the CLK$_{out}$' signal 1332 through inverter 1314 and an RC low pass filter including resistor 1320 and capacitor 1318. The positive input of comparator 1326 is connected to the CLK$_{out}$ signal 1135 through inverter 1316 and an RC low pass filter including resistor 1324 and capacitor 1322. The inverters 1314 and 1316 are higher power (e.g., three times) than the other inverters 1308, 1310, 1312, 1328, and 1330 because they drive the RC low pass filters.

Figure 14:
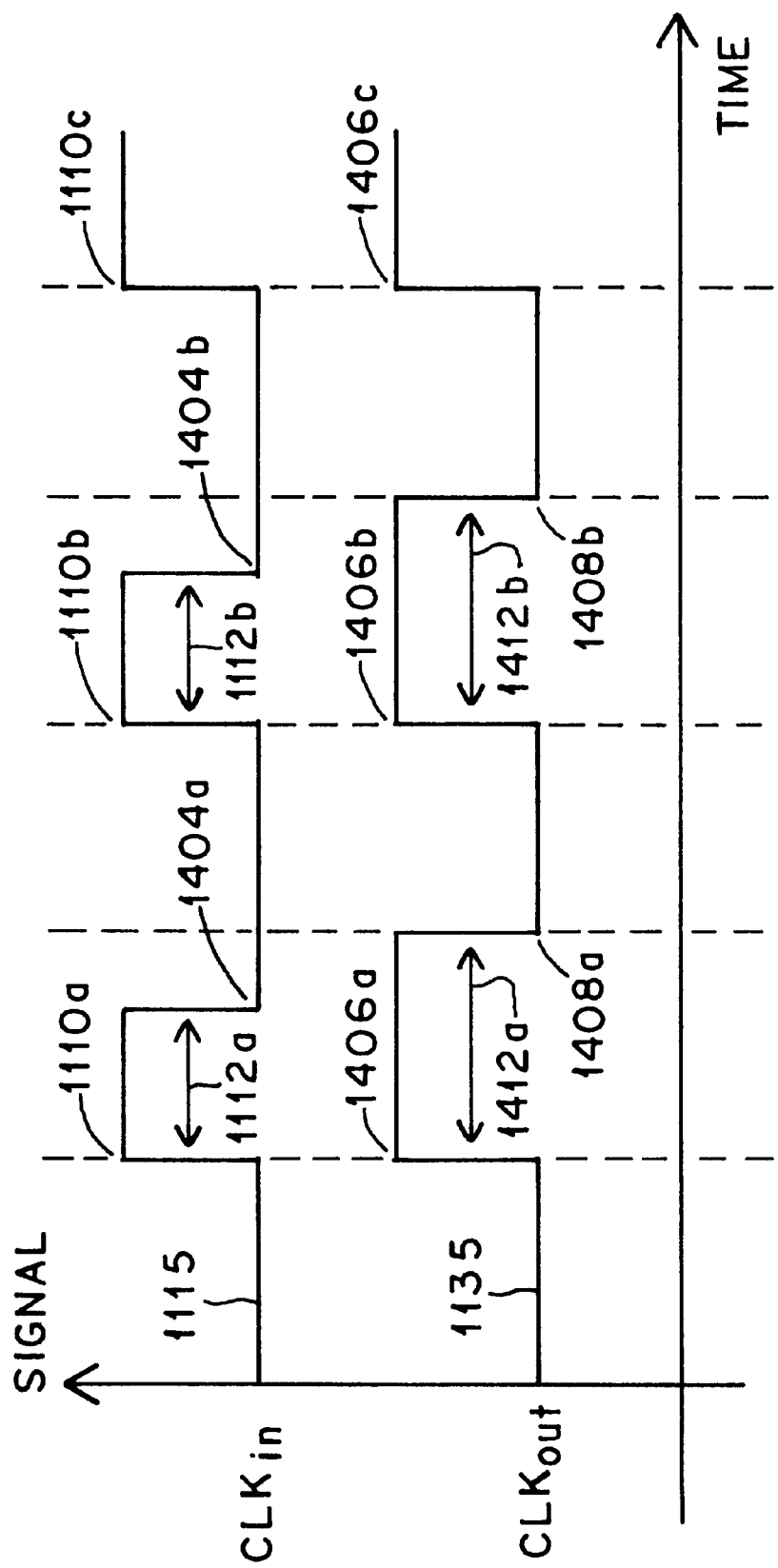
FIG. 14 is a timing diagram for the clock adjust circuitry of FIG. 13.

FIG. 14 is a timing diagram for clock adjust circuitry 1200. Control/logic circuitry 1210 allows the rising edges 1110a, 1110b and 1110c of the CLK$_{in}$ signal 1115 to pass through to provide the rising edges 1406a, 1406b, and 1406c of the CLK$_{out}$ signal 1135. When the control/logic circuitry 1210 receives the digital feedback signal from feedback network 1220, the NAND gates 1304 and 1306 trigger the falling edge of the CLK$_{out}$ signal 1135. (At this point, the NAND gate 1304 is assumed to have already received the falling edge of the CLK$_{in}$ signal 1115.) Because a crystal oscillator circuit may be used to provide the CLK$_{in}$ signal 1115 and crystal oscillator circuits have very little jitter, this pass-through technique provides superior jitter-free qualities for the rising edges 1406a, 1406b, and 1406c of the CLK$_{out}$ signal 1135. Alternatively, if the falling edge is desired to be used as the jitter-free edge, control/logic circuitry 1210 would allow the falling edges 1404a and 1404b of the CLK$_{in}$ signal 1115 to pass through to be the jitter-free edges of the CLK$_{out}$ signal 1135 and wait for a digital feedback signal to trigger the rising edges of the CLK$_{out}$ signal 1135. The jitter-free edges are the edges used to sample the incoming continuous time voltage. It is noted that clock control/logic circuitry 1210 is not limited to the logic circuitry depicted in FIG. 13 and may be any desired logic or control circuitry that acts to pass through each rising edge or falling edge as a jitter-free edge and waits for a feedback signal to trigger the subsequent falling edge or rising edge, respectively.

Clock adjust circuitry 1200 acts to expand a less than 50% duty cycle CLK$_{in}$ signal 1115 to an approximately 50% duty cycle for the CLK$_{out}$ signal 1135. This is desirable because crystal oscillator circuits often do not have consistent duty cycles. For example, as show in FIG. 14, the portions 1112a and 1112b may be only approximately 40% of the total time for period of the CLK$_{in}$ signal 1115. Clock adjust circuitry 1200 adjusts the duty cycle of the CLK$_{out}$ signal 1135 by controlling the falling edges 1408a and 1408b of the CLK$_{out}$ signal 1135 with the digital feedback signal from the feedback network 1220. The digital feedback signal generated by comparator 1326 and RC filters 1318/1320 and 1322/1324 has a trigger point defined by when the filtered CLK$_{out}$ signal 1135 falls below the filtered CLK$_{out}$' signal 1332. As the clock adjust circuitry 1200 operates over numerous cycles this trigger point of the feedback network 1220 converges to a point where the voltage average of the CLK$_{out}$ signal equals the voltage average of the CLK$_{out}$' signal. In other words, one edge of an output digital clock is adjusted such that a DC average of an output of the digital clock is equal to the DC average of a complement of the output digital clock. In this way, the feedback network 1220 and clock control/logic circuitry 1210 work together to move the falling edges 1408a and 1408b of the CLK$_{out}$ signal to a point close to a 50% duty cycle for portions 1412a and 1412b over 30–50 cycles of the CLK$_{out}$ signal.

The number of cycles required for the clock adjust circuitry 1200 to resolve into its final duty cycle state and its final duty cycle percentage depends upon the values chosen for the resistors (R) 1320 and 1324 and the capacitors (C) 1318 and 1322. For example, if the RC time constant is set to 320 nanoseconds (ns), and the period of the CLK$_{in}$ signal 1115 is 60 ns, the final duty cycle percentage is about 47.6%, and the final duty cycle state is resolved in about 25–35 cycles. If the RC time constant is set to 640 ns, the final duty cycle percentage is increase to 48.8%, but the time to resolve into the final duty cycle state is increased to about 50–60 cycles. Thus, there is a design trade-off between time to resolution and increase duty cycle.

With the embodiment for clock control/logic circuitry 1210 depicted in FIG. 13, a stability problem occurs if the CLK$_{in}$ signal 1115 has an initial duty cycle of greater than 50%. If so, the logic provided by NAND gates 1304 and 1306 will not see the falling edge trigger provided by feedback network 1220. Monostable multi-vibrator 1302 provides a solution to this problem by using the rising edges 1110a, 1110b and 1110c to force a clock signal that has a duty cycle of less than 50%, for example a clock signal having a duty cycle of 30%.

The clock adjust circuitry 1200 according to the present invention is not limited to use with sampling circuits. For example, clock adjust circuitry 1200 may be used in a frequency-doubling application. Previously, frequency-doubling monostable multi-vibrator circuits have been utilized to provide an output clock pulse for each rising and falling edge of a digital clock input signal. The clock adjust circuitry 1200 of the present invention may be used to adjust this digital clock input signal to provide a 50% duty cycle digital clock signal to the frequency-doubling monostable multi-vibrator. Because the rising and falling edges of the digital clock input signal would then be evenly spaced, the output clock pulses from the frequency-doubling monostable multi-vibrator would also be evenly spaced and twice the frequency of the digital clock input signal. Additional clock adjust circuitry 1200 according to the present invention may then be connected to the output of the frequency-doubling monostable multi-vibrator to adjust the frequency-doubled clock signal to have a 50% duty cycle. Similarly, additional frequency-doubling monostable multi-vibrator circuits and clock adjust circuitry 1200 blocks according to the present invention may be cascaded together to provide four-times (4×), eight-times (8×), etc. clock output signals having a 50% duty cycle from a single digital input clock signal.

Figure 15:
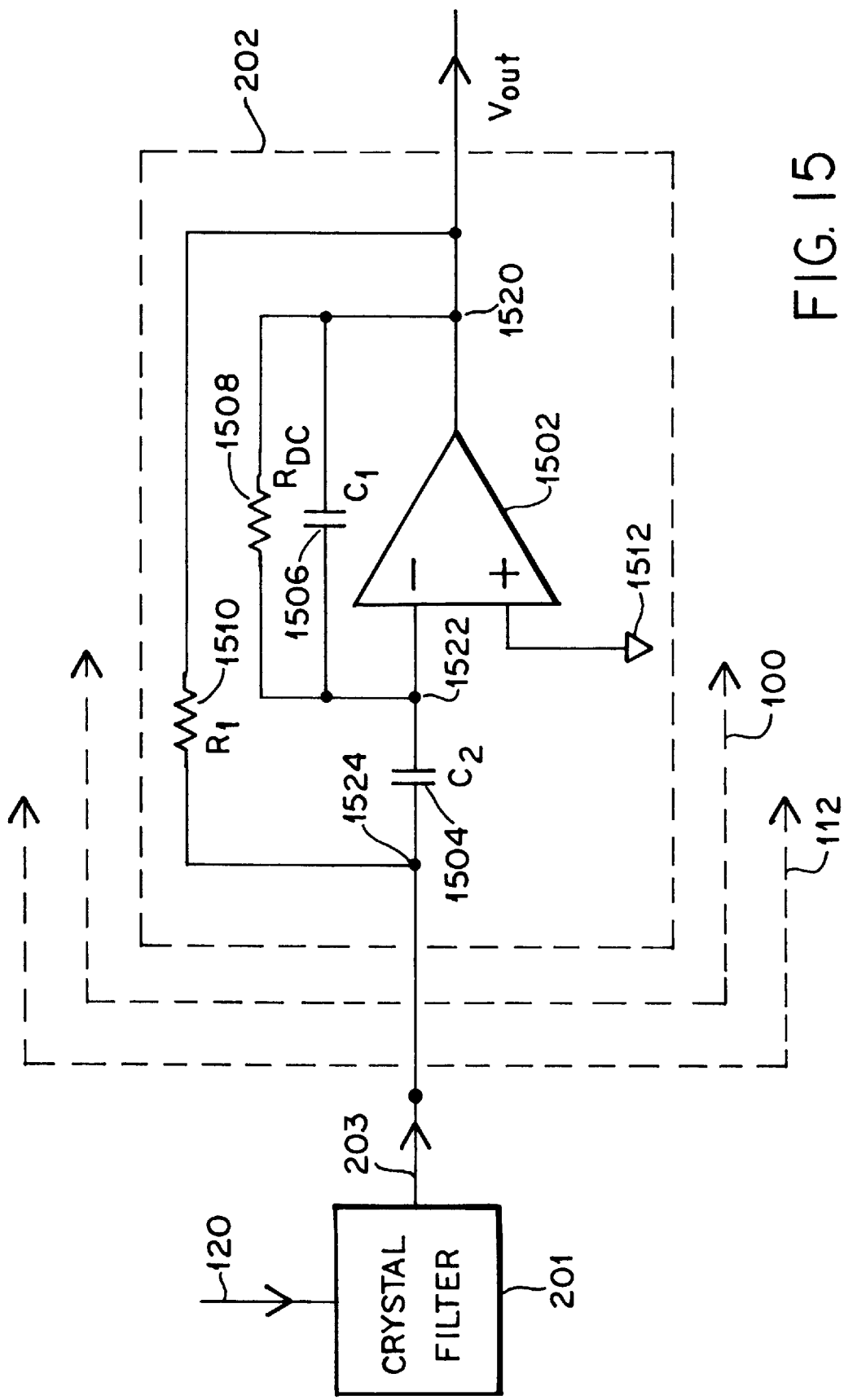
FIG. 15 is a detailed circuit diagram of a matched impedance input amplifier according to the present invention.

FIG. 15 is a detailed circuit diagram of an input amplifier 202 within receive section 100 of IF transceiver IC 112, which receives filtered IF signals 203 from an external crystal filter 201. The positive input terminal of operational amplifier 1502 is connected to ground or common mode voltage 1512. Input capacitor ($C_2$) 1504 is connected between input node 1524 and negative input terminal 1522 of operational amplifier 1502. Feedback capacitor ($C_1$) 1506 is connected between output node 1520 and negative input terminal 1522 of operational amplifier 1502. Resistor ($R_{DC}$) 1508, which is connected between output node 1520 and negative input terminal 1522 of operational amplifier 1502, is included to handle DC levels and is selected so that the break frequency created by $R_{DC}C_1$ is substantially less than the desired operating frequency of input amplifier 202. Shunt feedback resistor ($R_1$) 1510 is connected between output node 1520 and input node 1524. The gain (a) of input amplifier 202 is $a=C_2/C_1$ at the operating frequency. Without shunt feedback resistor ($R_1$) 1510, the input impedance ($Z_i$) of input amplifier 202 is $Z_i=Z_A=1/sC_2$. With shunt feedback resistor ($R_1$) 1510, the input impedance ($Z_i$) is $Z_1=R_1Z_A/[R_1+(a+1)Z_A]$. If $Z_A \gg R_1$, which is the desired situation, then the input impedance ($Z_i$) becomes $Z_iR_1/(1+a)$.

In operation, it is desirable that the input impedance ($Z_i$) of input amplifier 202 match the load impedance ($Z_S$) that the crystal filter 201 desires to see. Crystal filter 201, for example, may desire a load conductance ($Y_S$) given by $Y_S=1/Z_S=1/R_S+sC_S$, where $R_S$ is 1200 Ω and $C_S$ is 3 pF. The capacitive component of this desired load conductance ($Y_S$) may be matched using the input capacitor ($C_2$) 1504.

The most direct approach to match the resistive component of this desired load conductance ($Y_S$) is to connect a matched resistor ($R_m$) having the same value as $R_S$ between input node 1524 and ground 1512 and not to use shunt feedback resistor ($R_1$) 1510. Utilizing this matched resistor approach, ignoring high frequency poles, and assuming the load is properly matched, the noise figure (F) is approximately:

$$F \approx 1+1+4[e_n^2/e_s^2],$$

where $e_n$ represents the noise of the internal capacitor feedback amplifier with gain of "a" and $e_s$ represents the noise of the source. Because of the significant noise generated by the matched resistor ($R_m$) represented by the second term of the noise figure (F), the operational amplifier 1502 must to be a very high power operational amplifier to keep the total noise of the input amplifier 202 at an acceptable level.

According to the present invention, shunt feedback resistor ($R_1$) 1510 is utilized to match the resistive term of the desired load impedance ($Z_S$) of crystal filter 201 and to provide a reduction in the noise figure associated with the matched resistor approach. To make $Z_i$ match $Z_S$, according to the present invention, $Y_i=1/Z_A+(a+1)/R_1$ must match $Y_S=sC_S+1/R_S$. Utilizing this relationship, the resistive component may be matched utilizing the following relationship: $R_S=R_1/(a+1)$ and $C_S=1/Z_A=C_2=aC_1$. Thus, shunt feedback resistor ($R_1$) 1510 and the loop gain "a" ($a=C_1/C_2$) are used to control the resistive component of the input impedance ($Z_i$) of input amplifier 202 so that it matches the resistive component of the desired load impedance ($Z_S$) of crystal filter 201. The input capacitor ($C_2$) 1504 ($C_2=aC_1$) is used to control the capacitive component of the input impedance ($Z_i$) of input amplifier 202 so that it matches the capacitive component of the desired load impedance ($Z_S$) that crystal filter 201 wants to see. Considering the pad capacitance of the terminal of IF transceiver IC 112 to which crystal filter 201 is attached, the input capacitance equation may be adjusted to $C_S=C_2+C_{pad}=aC_1+C_{pad}$.

Utilizing a shunt feedback resistor according to the present invention, again ignoring high frequency poles, and again assuming the load is properly matched, the noise figure (F) is approximately:

$$F \approx 1+1/(a+1)+[(a+2)/(a+1)]^2[e_n^2/e_s^2].$$

Compared to the matched resistor approach, the input amplifier of the present invention provides a significant reduction in the noise figure. In particular, the second term of the noise figure (F), which is due to the matching resistor, is reduced by a factor of $1/(a+1)$. The third term of the noise figure (F), which is due to amplifier noise, is reduced by a factor of almost ¼, assuming that $(a+2)/(a+1) \approx 1$. The reduction in the resistor noise figure term ($F_R$) caused by shunt feedback resistor ($R_1$) 1510 significantly reduces the power requirements of operation amplifier 1502. The present invention, therefore, allows for a low power, matched input impedance input amplifier that provides superior noise characteristics.

Figure 16:
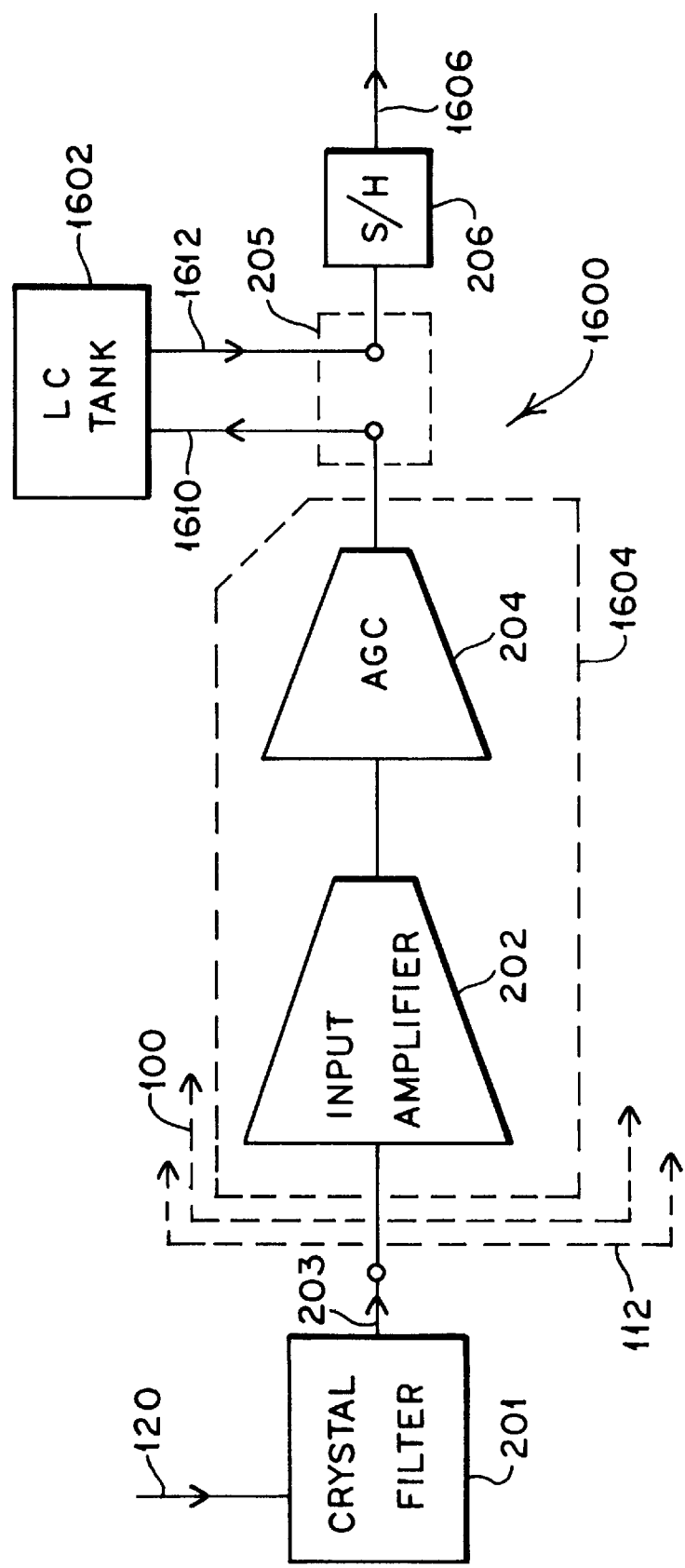
FIG. 16 is a block diagram of anti-aliasing circuitry for the receive section of an IF transceiver according to the present invention.

FIG. 16 is a block diagram of anti-aliasing circuitry 1600 for receive section 100 of IF transceiver IC 112. Crystal filter 201 receives IF signals ($f_{if}$) 120 and outputs filtered IF signals 203. Input amplifier 202 and AGC amplifier 204 together make up limiter 1604. LC tank 1602 receives signals from limiter 1604 through line 1610 and outputs a filtered signal to sampling circuitry (S/H) 206. LC tank 1602 is external to IF transceiver IC 112 and is connected to IF transceiver IC 112 through connections 205. Sampling circuitry 206 samples the filtered signal from LC tank 1602 at a sampling frequency ($f_s$) and provides sampled values at an internal IF signal frequency ($f_{IF}$) to analog quadrature down conversion block 208. The internal IF signal frequency ($f_{IF}$) is dependent upon the frequency ($f_{if}$) of the input IF signal 120 and the sampling frequency ($f_s$) and is given by $f_{IF}=f_{if}-Kf_s$, where K is an integer which denotes the amount of subsampling. More particularly, $K=RND(f_{if}/f_s)$, where the RND function determines the closest integer multiple of $f_s$ to $f_{if}$. For example, if $f_s=16.8$ MHz and $f_{if}=21.4$ MHz as set forth in the example below, K is equal to 1, and the internal IF signal frequency is $f_{IF}=4.6$ MHz. After sampling, the internal IF signal frequency $f_{IF}$ can only be between $-f_s/2$ and $f_s/2$, so that $-f_s/2 \leq f_{IF} \leq f_s/2$.

Limiter 1604 within receive section 100 of IF transceiver 112 will typically hard-limit filtered IF signal 203 when it exceeds the dynamic range of the receive section 100. This hard-limiting can occur during very large signal conditions or during up-shadowing, which happens when AGC amplifier 204 does not respond instantaneously to a sudden increase in the power of the received signal. If receive section 100 employs a constant-amplitude modulation scheme, the signal can be recovered, even in the presence of large signals or interferers at interfering frequencies ($f_{int}$), provided that the harmonic distortion and intermodulation distortion (IMD) are outside of the desired signal bandwidth. Interferers may arise, for example, from adjacent communication channels. In limiter 1604, interferers cause IMD at frequencies ($f_{IMD}$) given by $f_{IMD}=kf_{int}+mf_{if}$, where k=±0, 1, 2, 3, 4, . . . , and where m=±0, 1, 2, 3, 4, . . . . Harmonic distortion caused by these interferers occur at harmonic frequencies ($f_{harm}$) represented by m=0 in this equation and given by $f_{harm}=kf_{int}$. Subsequent sampling of the signal in discrete-time causes aliasing of these distortions. This aliasing may create distortions at frequencies that overlap with the internal IF signal frequency ($f_{IF}$) of the receive section 100.

Figure 17:
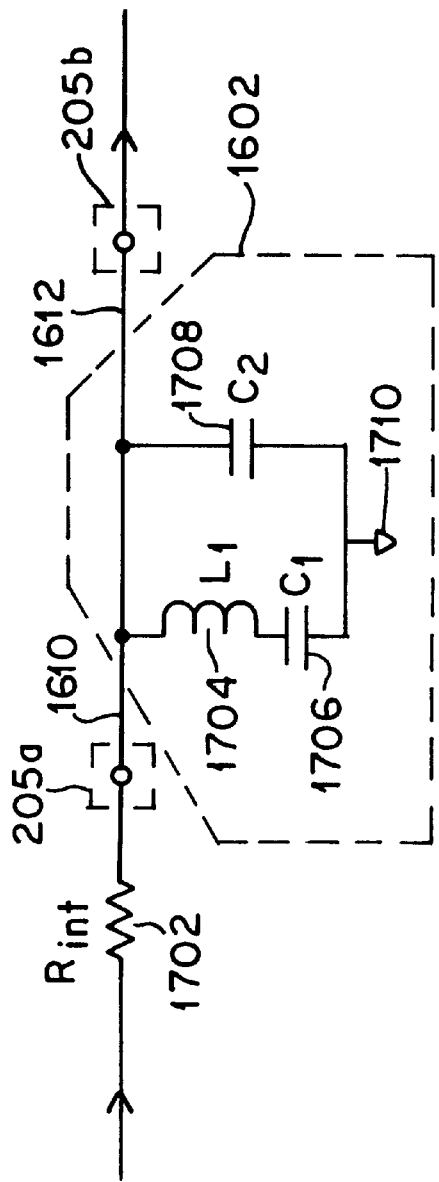
FIG. 17 is a detailed circuit diagram of an LC tank for the anti-aliasing circuitry of FIG. 16 according to the present invention.

FIG. 17 is a detailed circuit diagram of LC tank 1602. Line 1610 and line 1612 are connected together. An inductor ($L_1$) 1704 and a first capacitor ($C_1$) 1706 are connected in series between lines 1610 and 1612 and ground or common mode voltage 1710. A second capacitor ($C_2$) 1708 is also connected between lines 1610 and 1612 and ground 1710. An internal resistor ($R_{int}$) 1702 may be positioned within IF transceiver IC 112 before connection 205a. The output of LC tank 1602 passes back into IF transceiver IC 112 through connection 205b. The component values for LC tank 1602 may be selected to provide desired filter characteristics. For example, with a 21.4 MHz input IF signal ($f_{if}$) 120, the components may be selected as $R_{int}$=1 kΩ, $L_1$=820 nH, $C_1$= 10 nF, and $C_2$=68 pF. Other designs and component values may be used for LC tank 1602 depending upon the anti-aliasing properties desired.

Figure 18:
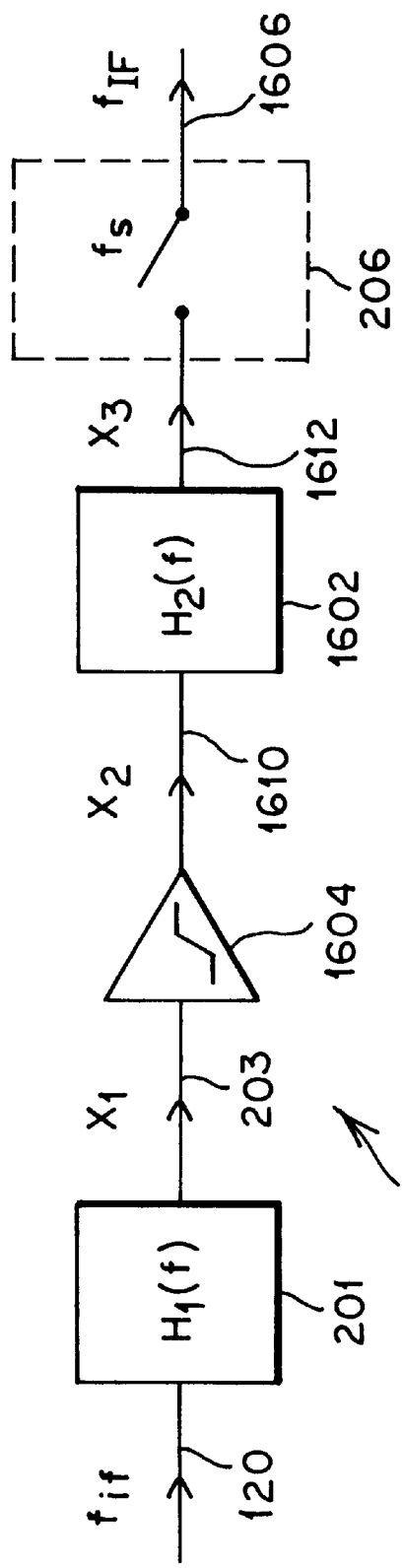
FIG. 18 is a more general block diagram for the anti-aliasing circuitry of FIG. 16 according to the present invention.

FIG. 18 is a more general block diagram of anti-aliasing circuitry 1600. First filter 201 receives input IF signals 120 at an input IF frequency ($f_{if}$) and has a first anti-aliasing filter $H_1(f)$ 201. Limiter 1604 receives filtered IF signal ($X_1$) 203. Second filter 1602 receives the output signal ($X_2$) 1610 of limiter 1604 and has a second anti-aliasing filter $H_2(f)$. Sampling circuitry 206 samples the signal ($X_3$) 1612 at a sampling frequency ($f_s$) and provides sampled values 1606 at an internal IF signal frequency ($f_{IF}$).

First filter 201 may be a bandpass filter, such as a crystal filter, which provides rejection of interferers to limit the number of interferers presented to limiter 1604. This initial rejection of interferers reduces the possibility of in-band IMD when limiter 1604 limits the input signal and reduces the number and location of harmonics produced when limiting occurs. To improve response linearity, limiter 1604 should provide a large linear range before clipping, although the limiter 1604 may be allowed to clip asymmetrically. The second filter 1602 may be a bandpass filter, such as an LC tank, which rejects the harmonics of the interferers that leak through first filter 201 so that these harmonics will not be aliased into the signal bandwidth after sampling. According to the present invention, first filter 201, the second filter 1602, the sampling frequency ($f_s$), and the input IF signal frequency ($f_{if}$) 120 are selected to provide desired anti-aliasing characteristics to reduce aliased distortions that may interfere with the internal IF signal frequency ($f_{IF}$). Although neither the first nor the second filter may fully channelize the signal, channelization may be accomplished in the digital domain.

Figure 19:
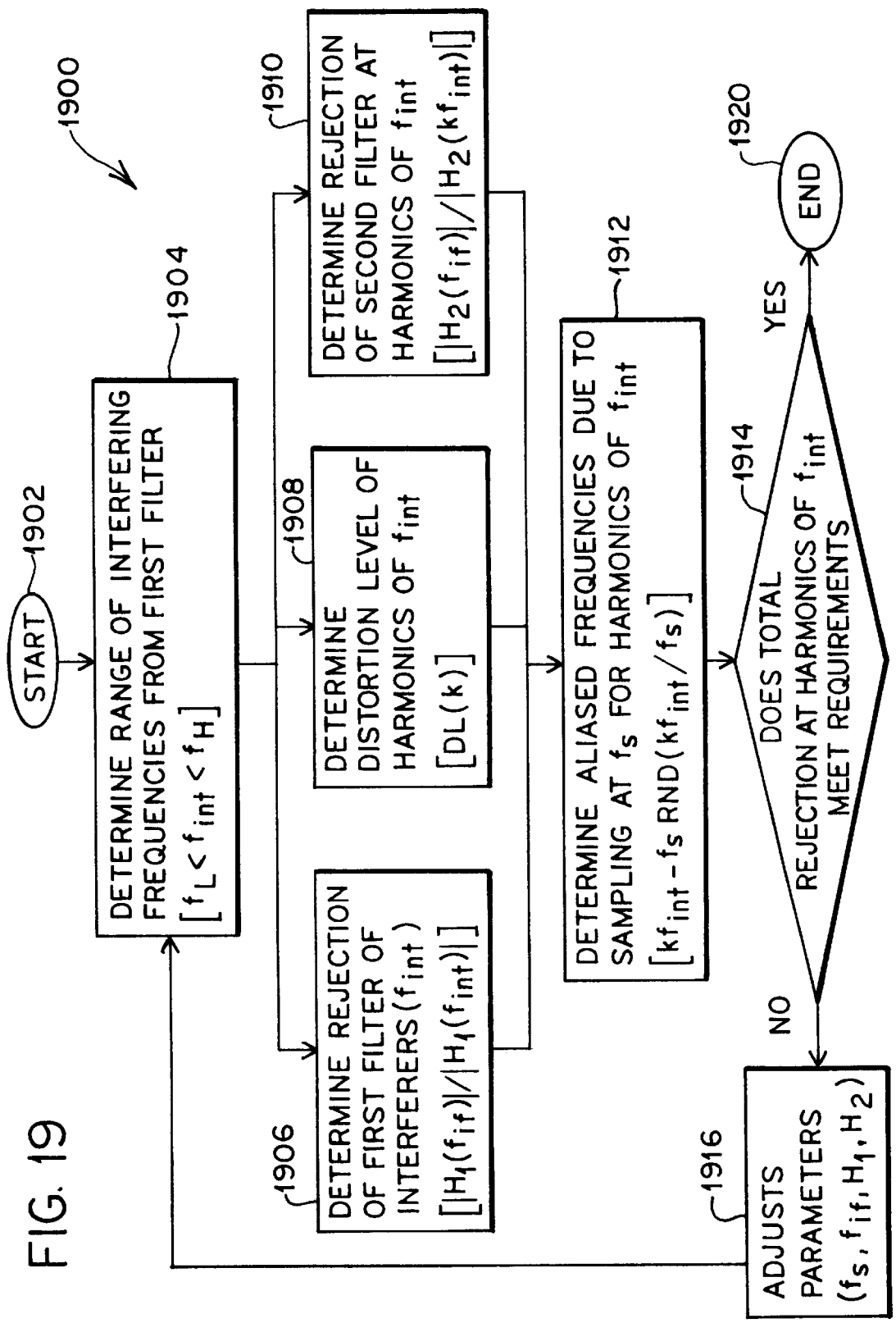
FIG. 19 is a flow chart of a method for choosing design parameters to provide desired rejection of aliased interfering frequencies according to the present invention.

FIG. 19 is a flow chart of an anti-aliasing method 1900 for choosing design parameters to provide desired rejection of potentially interfering frequencies. This method involves estimating the spectral location and magnitude of distortion terms and attacking them through the combination of two anti-aliasing filters ($H_1(f)$ and $H_2(f)$) and the choice of sampling frequency ($f_s$) and input IF frequency ($f_{if}$). From start block 1902, the first step 1904 is to determine the approximate frequency range of potential interfering signals or interferers ($f_{int}$) from the rejection profile of the first filter 201. For example, a bandpass crystal filter centered on the input IF frequency ($f_{if}$) may be used as first filter 201 to provide a high level of rejection (e.g., 60 dB rejection) of potential interferers ($f_{int}$). However, for a crystal filter there will typically be a range between a cut-off frequency ($f_L$) lower than the input IF frequency ($f_{if}$) and a cut-off frequency ($f_H$) higher than the input IF frequency ($f_{if}$) in which the filter response can contain spurs. These spurs may lead to potential interferers ($f_{int}$) within this range having inadequate rejection (e.g., 15 dB rejection).

Steps 1906, 1908 and 1910 are then performed to determine the distortion rejection of anti-aliasing circuitry 1600. In step 1906, the inteferer rejection of first filter 201 is determined for potential interferers ($f_{int}$). This rejection ($R_1$) of inteferers by the first filter 201 may be represented by $R_1 = |H_1(f_{if})|/|H_1(f_{int})|$ (dB). In step 1908, the distortion level of harmonics generated by limiter 1604 are determined at the harmonics of the potential interferers ($kf_{int}$, where k is 2, 3, 4, . . . ). This distortion level (DL) of harmonics may be represented by DL(k) (dB), where k is 2, 3, 4, . . . The value of DL(k) is determined by estimating the worst case magnitude level of each harmonic of an inteferer relative to the level of the fundamental inteferer. DL(k) is a function of the nonlinearity of the amplifier of limiter 1604. In step 1910, the rejection of harmonic distortion by second filter 1602 is determined at the harmonics of the potential interferers ($kf_{int}$, where k is 2, 3, 4, . . . ). This distortion rejection ($DR_2$) of second filter 1602 may be represented by $DR_2(k) = |H_2(f_{if})|/|H_2(kf_{int})|$ (dB). The total rejection of the anti-aliasing circuitry 1600 for any given harmonic frequency range is $R_{total}(k) = R_1 + DL(k) + DR_2(k)$. In the final step 1912 before the decision block 1914, the aliased interfering frequencies ($f_{alias}$) caused by sampling in discrete-time at the sampling frequency $f_s$ is determined at the harmonics of the potential interferers ($kf_{int}$, where k is 2, 3, 4, . . . ). These aliased interfering frequencies ($f_{alias}$) are $f_{alias}(k) = kf_{int} - f_s * \text{RND}(kf_{int}/f_s)$, where the RND function determines the closest integer multiple of $f_s$ to $kf_{int}$. The internal operating IF frequency ($f_{IF}$) is defined by the sampling frequency ($f_s$) and the input IF frequency ($f_{if}$), such that $f_{IF} = f_{if} - Kf_s$, where K represents the amount of sub-sampling as set forth above. For an over-sampling system, $f_{IF}$ will typically be equal to $f_{if}$ because Nyquist sampling at $f_s \geq 2f_{if}$ is typically required, which makes K=0.

In decision block 1914, the total rejection ($R_{total}(k)$) at the harmonics of the potential interferers ($kf_{int}$, where k is 2, 3, 4, . . . ) are compared to design requirements for rejection of interfering frequencies. If the aliased interfering frequency range $f_{alias}(k)$ for a given harmonic does not include the internal operating IF frequency ($f_{IF}$), then there is no danger of distortions within that harmonic being aliased to interfere with the IF signals being processed. IF desired, therefore, the distortion rejection for these harmonics of the potential interferers need not be determined to conclude that the rejection requirement has been met. However, if the aliased interfering frequency range $f_{alias}(k)$ for a given harmonic does include the internal operating IF frequency ($f_{IF}$), then the total rejection ($R_{total}(k)$) for that harmonic must meet the design requirements. If all requirements are met, end block 1920 is reached. If all requirements are not met, then the design parameters may be adjusted in block 1916 and steps 1904, 1906, 1908, 1910, 1912 and 1914 may be repeated.

In step 1916, although it is possible to alter any of the different parts of anti-aliasing circuitry 1600, the design parameters more easily adjusted include the sampling frequency ($f_s$), the input IF frequency ($f_{if}$), the response of the first filter ($H_1(f)$), and the response of the second filter ($H_2(f)$). In particular, the sampling frequency ($f_s$) and the input IF signal frequency ($f_{if}$) may be selected and adjusted to provide desired rejection of distortions so that anti-aliasing circuitry 1600 will preserve the signal under limiting conditions without placing tight requirements on the first and second analog filters. Furthermore, of these parameters, it is likely that the input IF frequency ($f_{if}$) may be controlled by other system design concerns and that the first filter ($H_1(f)$) and the second filter ($H_2(f)$) may quickly reach practical limits to their distortion rejection. This leaves the sampling frequency ($f_s$) as the parameter that may be most easily adjusted to make sure that the total rejections ($R_{total}(k)$) for all harmonics of potential interferers meet design requirements.

TABLE 1 below provides example distortion rejection determinations for anti-aliasing circuitry utilizing a crystal filter, an input amplifier, an AGC amplifier and an LC tank as depicted in FIG. 16. For this example in TABLE 1, the input IF frequency is $f_{if}$=21.4 MHz, the sampling rate is $f_s$=16.8 MHz, and the internal operating IF frequency $f_{IF}$= $f_{if}-f_s$=4.6 MHz. In addition, the range of potential interferers ($f_{int}$) for the crystal filter is $f_L-f_H$=21.2–22.2 MHz because spurs in the filter transfer function can exist in this range that could limit rejection of interferes by the crystal filter to only 15 dB. Outside this range, where no spurs can occur, rejection of inteferers is approximately 60 dB. The range of interfering frequencies associated with harmonics of the range of potential interferers ($f_{int}$) is given in the second column ($kf_{int}$). The rejection determination of the first filter, the relative distortion level of harmonics created by the limiter, and the harmonic distortion rejection of the second filter are provided in the next three columns for each harmonic range of interfering frequencies. The range of interfering frequencies after aliasing of the harmonics is given in the sixth column ($f_{alias}(k)$). The requirement for total distortion rejection for all harmonic ranges is assumed to be 60 dB, which is met in TABLE 1 either because there is no aliased interferers at the internal operating IF frequency ($f_{IF}$) or because the total distortion rejection for that harmonic meets the 60 dB requirement. It is noted that for harmonic ranges associated with k=2, 3, 5 and 7 the distortion rejection determinations need not be made because the aliased frequency range does not include the internal operating IF frequency ($f_{IF}$).

TABLE 1

Example Rejection Determinations

| k | $kf_{int}$ | $R_1$ | DL(k) | $DR_2(k)$ | $f_{alias}(k)$ | $R_{total}(k)$ |
|---|---|---|---|---|---|---|
| 2 | 42.4–44.4 MHz | 15 dB | 13 dB | 16 dB | 6.0–8.0 MHz | no aliasing at $f_{IF}$ |
| 3 | 63.6–66.6 | 15 | 9 | 22 | 0.6–3.6 | no aliasing at $f_{IF}$ |
| 4 | 84.8–88.8 | 15 | 20 | 25 | 0.8–4.8 | 60 dB |
| 5 | 106.0–111.0 | 15 | 14 | 27 | 5.2–8.4 | no aliasing at $f_{IF}$ |
| 6 | 172.2–133.2 | 15 | 25 | 29 | 1.2–7.2 | 69 dB |
| 7 | 148.4–155.4 | 15 | 17 | 30 | 0.0–4.2 | no aliasing at $f_{IF}$ |
| 8 | 169.6–177.6 | 15 | 29 | 32 | 1.6–8.4 | 76 dB |
| 9 | 190.8–199.8 | 15 | 19 | 33 | 1.8–8.4 | 67 dB |
| ↓ | ↓ | ↓ | ↓ | ↓ | ↓ | ↓ |

Figure 20:
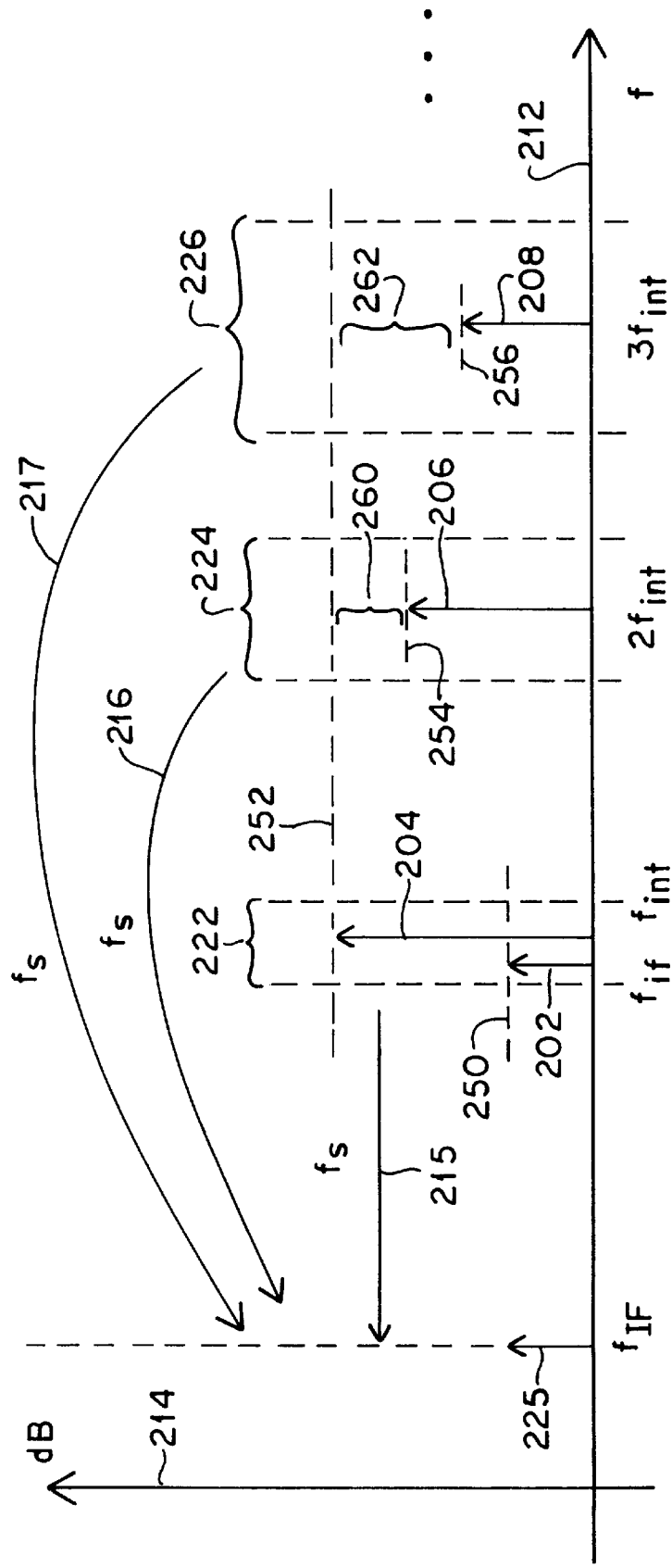
FIG. 20 is a graphical representation of harmonic distortion that may result from interfering frequencies.

To further explain the example in TABLE 1, FIG. 20 depicts graphical representations of distortion terms that may result due to harmonic distortion. The horizontal axis 212 represents frequency (f) and the vertical axis 214 represents magnitude (dB). A potential interferer ($f_{int}$) 204, which has magnitude level 252, is located near the input IF frequency ($f_{if}$) 202, which has magnitude level 250. Interferers that are located close to the input IF frequency ($f_{if}$) and that are much larger than the level of the input signal, as shown in FIG. 20, are typically what is expected to cause significant problems with aliased distortions. After limiting, harmonic distortion terms 206 and 208 are created correlating to the harmonics $2f_{int}$, $3f_{int}$, etc. of the fundamental frequency for the interferer ($f_{int}$) 204. (It is noted that IMD terms, which are not shown, are also associated with harmonic distortion terms 206 and 208; however, because these terms are typically much smaller than the harmonic distortion terms, they tend to be adequately rejected as long as the harmonic distortion terms are adequately rejected.) After sampling, the harmonic distortion terms 206 and 208 can potentially be aliased such that they interfere with the internal IF signal frequency ($f_{IF}$) 225.

The distortion levels (DL(k)) of the harmonic distortion terms 206 and 208 are represented graphically by the differences 260 and 262. Differences 260 and 262 are the differences between the signal magnitude level 252 at the fundamental frequency of the inteferer ($f_{int}$) 204 and the signal magnitude levels 254 and 256 at the harmonic frequencies of the interferer ($2f_{int}$, $3f_{int}$, etc.). These distortion level (DL(k)) values are found in column 4 of TABLE 1.

Range 222 represents the range around the input IF frequency ($f_{if}$) 202 in which the crystal filter transfer function may include spurs so that adequate rejection of inteferers may not occur. In TABLE 1, this range 222 of potential interferers is $f_L-f_H$=21.2–22.2 MHz. Thus, with a crystal filter as the first filter, potential interferer ($f_{int}$) 204 may fall anywhere within range 222. Harmonic distortion ranges 224 and 226 are associated with harmonic distortion terms 206 and 208 of the interferer ($f_{int}$) 204. Because the potential inteferer ($f_{int}$) 204 may fall anywhere within range 222, the harmonic distortion terms 206 and 208 may fall anywhere within ranges 224 and 226, respectively. It is noted that the second harmonic range 224 will be two times the width of range 222, the third harmonic range 226 will be three times the width of range 222, etc.

Sampling of the input IF frequency ($f_{if}$) 202 at a sampling frequency ($f_s$) (16.8 MHz in TABLE 1) causes aliasing 215 of the input IF frequency ($f_{if}$) 202 (21.4 MHz in TABLE 1) to the internal operating IF frequency ($f_{IF}$) (4.6 MHz in TABLE 1). Sampling likewise causes aliasing 216 and 217 of ranges 224 and 226 of potential harmonic distortion frequency ranges. In TABLE 1, the aliased harmonic frequency ranges ($f_{alias}(k)$), which are aliased due to sampling, are shown in the sixth column. If an aliased harmonic distortion range ($f_{alias}(k)$) includes the internal operating IF frequency ($f_{IF}$) 225, then it is possible that a potential inteferer ($f_{int}$) in range 222 will create a harmonic distortion term, such as in range 224 or 226, which will be aliased on top of the internal operating IF frequency ($f_{IF}$) 225 after sampling. Thus, as seen in TABLE 1, if an aliased harmonic frequency range ($f_{alias}(k)$) includes the internal operating IF frequency ($f_{IF}$), the parameters of the anti-aliasing circuitry must be chosen or adjusted to provide adequate rejection of potential inteferers and harmonic distortion for that range. If this is done, the aliasing of distortion terms (IMD and harmonic distortion) due to sampling will not cause distortion problems at the internal IF signal frequency ($f_{IF}$) because the distortion terms will have been adequately rejected prior to sampling.

What is claimed is:

1. A wireless communication system, comprising:
   an antenna for receiving and transmitting radio-frequency (RF) signals;
   frequency conversion circuitry for converting received RF signals into intermediate frequency (IF) signals and for converting output IF signals into transmitted RF signals;
   an IF transceiver receiving IF signals from and outputting IF signals to said frequency conversion circuitry, said IF transceiver having a receive section including a complex delta-sigma analog-to-digital converter with a loop filter that has real and complex filters cascaded together; and
   digital signal processing circuitry receiving and processing digital data from said IF transceiver.

2. The wireless communication system of claim 1, wherein said receive section of said IF transceiver further comprises an automatic gain control amplifier having negligible phase shift variation between a plurality discrete selectable gain levels.

3. The wireless communication system of claim 1, wherein said receive section of said IF transceiver further comprises digital clock adjust circuitry receiving a digital clock signal and providing an adjusted clock signal having a first edge produced by allowing a first edge of said digital clock signal to pass through and a second edge triggered by a digital feedback signal.

4. The wireless communication system of claim 1, further comprising a crystal filter located between said frequency conversion circuitry and said receive section of said IF transceiver, and wherein said receive section of said IF transceiver further comprises an input amplifier having a shunt feedback resistor used to match an input impedance of said input amplifier to a load impedance desired by said crystal filter.

5. The wireless communication system of claim 1, wherein said receive section of said IF transceiver further comprises anti-aliasing circuitry including:
a first anti-aliasing filter to receive signals at an input IF frequency from said frequency conversion circuitry;
a limiting amplifier connected to said first anti-aliasing filter; and
a second anti-aliasing filter connected to said limiting amplifier and producing an output signal that is subsequently sampled at a sampling frequency;
said input IF frequency, said sampling frequency, said first anti-aliasing filter, or said second anti-aliasing filter being selected and adjusted so that distortion rejection meets a desired level after sampling at an internal signal frequency.

6. An automatic gain control amplifier, comprising:
a variable gain amplifier having an input and an internal node, having a plurality of discrete selectable gain levels and having negligible phase shift variation between said discrete selectable gain levels;
an input impedance connected between said internal node and said input;
a feedback impedance connected between said internal node and an output of said amplifier, said plurality of discrete gain levels being dependent upon said feedback impedance and said input impedance; and
a variable input compensation impedance connected between said internal node and a common mode voltaie, said variable input compensation impedance combining with said input impedance to maintain constant the impedance seen by said amplifier at said internal node;
wherein said amplifier has a constant loop gain over all of said plurality of discrete gain levels; and
wherein said input impedance is a variable input impedance and said discrete gain levels are adjusted by varying said variable input impedance.

7. The automatic gain control amplifier of claim 6, wherein said variable gain amplifier has a substantially constant bandwidth over all of said discrete selectable gain levels.

8. A variable gain amplifier, comprising:
an amplifier having an input and an internal node;
a feedback impedance connected between said internal node and an output of said amplifier;
an input impedance connected between said internal node and said input;
said amplifier having a plurality of discrete gain levels dependent upon said feedback impedance and said input impedance and having negligible phase shift variation between said discrete gain levels; and a variable input compensation impedance connected between said internal node and a common mode voltage, said variable input compensation impedance combining with said input impedance to maintain constant the impedance seen by said amplifier at said internal node;
wherein said amplifier has a constant loop gain over all of said plurality of discrete gain levels; and
wherein said input impedance is a variable input impedance and said discrete gain levels are adjusted by varying said variable input impedance.

9. The variable gain amplifier of claim 8, wherein said input impedance and said variable input compensation impedance are implemented as capacitor networks.

10. The variable gain amplifier of claim 9, wherein said input impedance and said variable input compensation impedance are implemented as a single capacitor network.

11. The variable gain amplifier of claim 10, wherein said single capacitor network includes a plurality of capacitors connected to said internal node and alternatively connected to said input or to said common mode voltage.

12. A variable gain amplifier, comprising:
an amplifier having an input and an internal node;
a feedback impedance connected between said internal node and an output of said amplifier;
an input impedance connected between said internal node and said input;
said amplifier having a plurality of discrete gain levels dependent upon said feedback impedance and said input impedance and having negligible phase shift variation between said discrete gain levels; and
a variable previous-stage compensation impedance connected between said input and a common mode voltage, said variable previous-stage compensation impedance combining with said input impedance to maintain constant a load impedance seen by previous-stage circuitry;
wherein said amplifier has a constant loop gain over all of said plurality of discrete gain levels; and
wherein said input impedance is a variable input impedance and said discrete gain levels are adjusted by varying said variable input impedance.

13. The variable gain amplifier of claim 12, wherein said input impedance and said variable previous-stage compensation impedance are implemented as capacitor networks.

14. A method for switching between discrete gain level settings in a variable gain amplifier without introducing phase shift variations, comprising:
providing an amplifier having a plurality of discrete gain level settings defined by a ratio of a variable input impedance to a feedback impedance, said amplifier comprising:
an input and an internal node;
said feedback impedance connected between said internal node and an output of said amplifier;
said variable input impedance connected between said internal node and said input, said discrete gain levels being adjusted by varying said variable input impedance; and
a variable input compensation impedance connected between said internal node and a common mode voltage, said variable input compensation impedance combining with said input impedance to maintain constant the impedance seen by said amplifier at said internal node;

adjusting said variable input impedance to select one of said plurality of discrete gain level settings; and adjusting a variable input compensation impedance to compensate for changes in said variable input impedance to keep constant a loop gain of said amplifier over all of said discrete gain level settings and to inhibit introduction of phase shift variation between said discrete gain level settings.

15. The method of claim 14, wherein said adjusting steps include alternatively connecting capacitors to an input node of said amplifier or ground through switches.

16. Digital clock adjust circuitry, comprising:

control circuitry receiving a digital clock signal and providing an adjusted clock signal having a first edge produced by allowing a first edge of said digital clock signal to pass through and a second edge triggered by a digital feedback signal; and a feedback network connected between an output and input of said control circuitry to produce said digital feedback signal.

17. The digital clock adjust circuitry of claim 16, wherein said first edge is a jitter-free edge.

18. The digital clock adjust circuitry of claim 16, wherein said feedback network includes a first filter connected to said adjusted clock signal to provide a first output signal, a second filter connected to an inverse of said adjusted clock signal to provide a second output signal, and a comparator connected to said first and second output signals from said first and second filters and producing said feedback signal when said second output signal exceeds said first output signal.

19. The digital clock adjust circuitry of claim 16, wherein said feedback network acts to move said feedback triggered second edge within a period of said adjusted clock signal such that a portion of said period before said feedback triggered second edge is about 50%.

20. The digital clock adjust circuitry of claim 19, wherein said control circuitry includes a monostable multi-vibrator connected to said digital clock signal to force said digital clock signal to have a less than 50% duty cycle.

21. A discrete time sampling circuit, comprising:

a switched capacitor network connected to an input signal; and clock adjust circuitry receiving a digital clock signal and providing an adjusted clock signal to time said switched capacitor network, said adjusted clock signal having a jitter-free first edge and having a second edge triggered by a feedback signal.

22. The discrete time sampling circuit of claim 21, wherein clock adjust circuitry provides said jitter-free first edge by passing through a first edge of said digital clock signal.

23. The discrete time sampling circuit of claim 21, further comprising clock timing circuitry receiving said adjusted clock signal and providing to said switched capacitor network a first sampling signal based upon said feedback triggered second edge and a second sampling signal based upon said jitter-free first edge.

24. The discrete time sampling circuit of claim 21, wherein said jitter-free first edge is a rising clock signal and said feedback triggered second edge is a falling clock edge.

25. The discrete time sampling circuit of claim 21, wherein a portion of each period of said adjusted clock signal after said jitter-free edge is about 50%.

26. A method for adjusting a digital clock signal, comprising:

receiving a digital clock signal having a first and second edge within each clock cycle;

providing a first jitter-free output edge by passing through said first edge of said digital clock signal;

generating a feedback signal from said digital clock signal; and triggering a second output edge based upon said feedback signal, said first jitter-free output edge and said second output edge defining an output clock cycle.

27. The method of claim 26, wherein said first edge of said digital clock signal is a rising edge and said second edge of said digital clock signal is a falling edge.

28. The method of claim 26, wherein said generating step comprises generating a feedback signal that adjusts a duty cycle of said digital clock signal to provide said output clock cycle with an approximately 50% duty cycle.

29. An inverting input amplifier, comprising:

an amplifier having a finite input impedance at an operating frequency of said amplifier and having a gain that is approximately equal to a ratio of two impedances; and a shunt feedback resistor connected between an input and an output of said amplifier to adjust said finite input impedance to match a desired value;

wherein said amplifier is an operational amplifier having a gain set by an input capacitor connected to a negative terminal of said operational amplifier and a feedback capacitor connected between an output of said operational amplifier and said negative terminal.

30. The inverting input amplifier of claim 29, further comprising a resistor connected between said output of said operational amplifier and said negative terminal to handle DC levels, said resistor and said feedback capacitor having a break frequency substantially below said operating frequency of said amplifier.

31. A low power, matched impedance input amplifier for an intermediate frequency (IF) transceiver, comprising:

an inverting amplifier with controlled closed loop gain receiving an IF signal from a crystal filter;

a shunt feedback resistor connected between an input and an output of said amplifier to adjust said input impedance to match a load impedance desired by said crystal filter;

wherein said amplifier is an operational amplifier having a gain set by an input capacitor connected to a negative terminal of said operational amplifier and a feedback capacitor connected between an output of said operational amplifier and said negative terminal.

32. A method for providing matched impedance amplification with low power requirements for an intermediate frequency (IF) transceiver, comprising:

providing an inverting amplifier with a controlled closed loop gain receiving an IF signal from a crystal filter; and connecting a shunt feedback resistor between an output and an input of said amplifier to match an input impedance of said amplifier with a load impedance desired by said crystal filter;

wherein said providing step includes providing an operational amplifier having a gain set by an input capacitor connected to a negative terminal of said operational amplifier and a feedback capacitor connected between an output of said operational amplifier and said negative terminal.

33. A method for reducing aliased distortions in a discrete-time sampling receiver, comprising:

providing a first anti-aliasing filter to receive a signal at an input frequency;

providing a limiting amplifier connected to said first anti-aliasing filter;

providing a second anti-aliasing filter connected to said limiting amplifier and producing an output that is to be subsequently sampled at a sampling frequency;

estimating frequency ranges for potentially interfering distortions;

determining rejection of distortions for said first anti-aliasing filter, said limiting amplifier circuitry, and said second anti-aliasing filter in said frequency ranges;

adjusting parameters of at least one of said input frequency, said sampling frequency, said first anti-aliasing filter, or said second anti-aliasing filter; and repeating said estimating, said determining and said adjusting steps until said distortion rejection meets a desired level of distortion rejection.

34. The method of claim 33, wherein said receiver is a receive section of a discrete-time sampling intermediate frequency (IF) transceiver, and wherein said input frequency and said internal signal frequency are IF signals.

35. The method of claim 33, wherein said adjusting step comprises adjusting only said sampling frequency.

36. The method of claim 33, wherein said adjusting step comprises adjusting only at least one of said sampling frequency or said input frequency.

37. The method of claim 33, wherein said sampling frequency is below said input frequency.

38. The method of claim 33, wherein said estimating step comprises:

estimating a frequency range of potentially interfering distortions passed by said first anti-aliasing filter;

estimating frequency ranges for harmonics of said frequency range of potentially interfering distortions;

estimating frequency ranges for aliased harmonic frequency ranges due to sampling at said sampling frequency; and identifying aliased frequency ranges that include a desired after-sampling internal signal frequency as frequency ranges for potentially interfering distortions.

39. The method of claim 38, wherein said determining step comprises determining rejection of distortion terms for said first anti-aliasing filter, said limiting amplifier, and said second anti-aliasing filter in each of said aliased frequency ranges that include said desired after-sampling internal signal frequency.

40. The method of claim 38, wherein said first anti-aliasing filter is a crystal filter.

41. Anti-aliasing circuitry for a discrete-time sampling receiver section of an intermediate frequency (IF) transceiver, comprising:

a first anti-aliasing filter to receive a signal at an input frequency;

a limiting amplifier connected to said first anti-aliasing filter; and a second anti-aliasing filter connected to said limiting amplifier and producing an output that is to be subsequently sampled at a sampling frequency;

said input frequency, said sampling frequency, said first anti-aliasing filter, or said second anti-aliasing filter being selected so that rejection of distortion terms meets a desired level of distortion rejection at a desired after-sampling internal signal frequency.

42. The anti-aliasing circuitry of claim 41, wherein said discrete-time sampling receiver is a receive section of an intermediate frequency (IF) transceiver and wherein said input frequency and said internal signal frequency are IF frequencies.

43. The anti-aliasing circuitry of claim 41, wherein said first anti-aliasing filter is a crystal filter.

44. The anti-aliasing circuitry of claim 41, wherein said second anti-aliasing filter is an LC tank.

45. The anti-aliasing circuitry of claim 41, wherein said sampling frequency is below said input frequency.

46. The anti-aliasing circuitry of claim 41, wherein said limiting amplifier includes a fixed gain input amplifier and an automatic gain control amplifier.

* * * * *

UNITED STATES PATENT AND TRADEMARK OFFICE
CERTIFICATE OF CORRECTION

PATENT NO. : 6,148,048
DATED : November 14, 2000
INVENTOR(S) : Donald A. Kerth et al.

It is certified that error appears in the above-identified patent and that said Letters Patent is hereby corrected as shown below:

Column 19, line 44, please change " voltaie" to --voltage--.

Signed and Sealed this

First Day of May, 2001

NICHOLAS P. GODICI

Attest:

Attesting Officer    Acting Director of the United States Patent and Trademark Office